United States Patent
Nakano

(10) Patent No.: US 10,513,395 B2
(45) Date of Patent: Dec. 24, 2019

(54) CARGO HANDLING APPARATUS AND OPERATION METHOD THEREOF

(71) Applicants: KABUSHIKI KAISHA TOSHIBA, Minato-ku (JP); Toshiba Infrastructure Systems & Solutions Corporation, Kawasaki-shi (JP)

(72) Inventor: Toshiki Nakano, Kawasaki (JP)

(73) Assignees: KABUSHIKI KAISHA TOSHIBA, Minato-ku (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 36 days.

(21) Appl. No.: 15/996,920

(22) Filed: Jun. 4, 2018

(65) Prior Publication Data
US 2018/0354720 A1 Dec. 13, 2018

(30) Foreign Application Priority Data
Jun. 9, 2017 (JP) .................................. 2017-114507

(51) Int. Cl.
*B65G 1/137* (2006.01)
*B65G 59/02* (2006.01)

(52) U.S. Cl.
CPC .......... *B65G 1/1375* (2013.01); *B65G 59/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,564,893 A * | 10/1996 | Tacchi | ................. | B65G 47/902 414/796.9 |
| 5,984,623 A * | 11/1999 | Smith | .................... | B65G 61/00 294/104 |
| 6,652,014 B2 * | 11/2003 | Schmalz | ................ | B65G 47/91 294/65 |
| 8,473,094 B2 * | 6/2013 | Becker | ................. | B65G 47/918 294/65 |

(Continued)

FOREIGN PATENT DOCUMENTS

| EP | 2 623 218 A2 | 8/2013 |
|---|---|---|
| JP | 4-244391 | 9/1992 |

(Continued)

*Primary Examiner* — Kyle O Logan
(74) *Attorney, Agent, or Firm* — Oblon, McClelland, Maier & Neustadt, L.L.P.

(57) ABSTRACT

According to embodiments, a cargo handling apparatus includes a first detecting unit, a target setting unit, a determination height position setting unit, a moving apparatus, a second detecting unit, and a controller unit. The target setting unit sets a cargo positioned in a highest position to a target, or if it is determined that the upper surface has no height difference, sets any one of the cargoes, forming a portion of the upper surface to the target. The determination height position setting unit sets a determination height position. The controller unit moves the target upward by driving the moving apparatus, and if it is determined that the target does not exceed the determination height position, determines that pull-out of the target is impossible, and stops an operation of the moving apparatus so as to stop a movement of the target.

6 Claims, 22 Drawing Sheets

(56) References Cited

U.S. PATENT DOCUMENTS

2007/0280812 A1* 12/2007 Morency .............. B25J 15/0253
            414/729
2016/0137435 A1   5/2016 Tanaka et al.
2016/0347558 A1  12/2016 Eto et al.
2017/0137236 A1   5/2017 Sonoura et al.

FOREIGN PATENT DOCUMENTS

| JP | 7-291450 A   | 11/1995 |
| JP | 2007-130711  | 5/2007  |
| JP | 2016-94280   | 5/2016  |
| JP | 2016-222377  | 12/2016 |

* cited by examiner

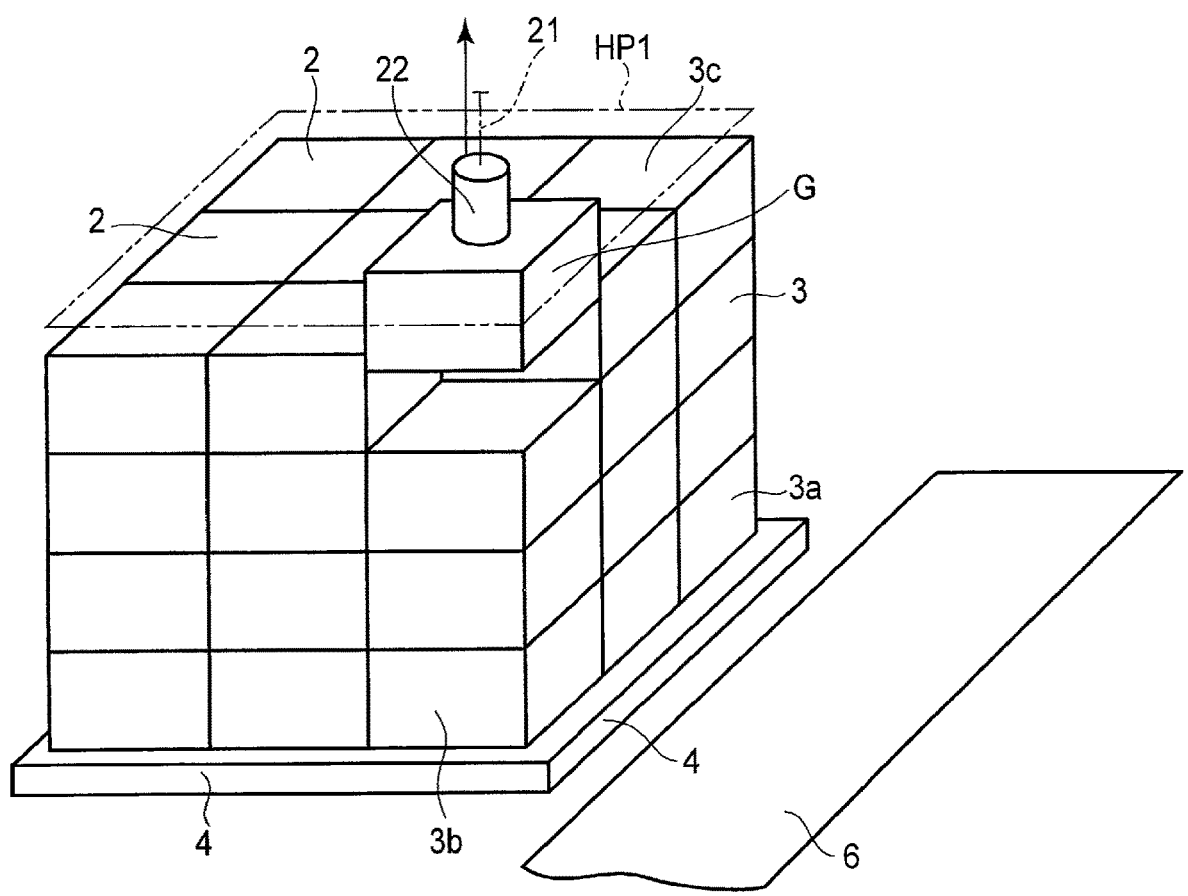
F I G. 8

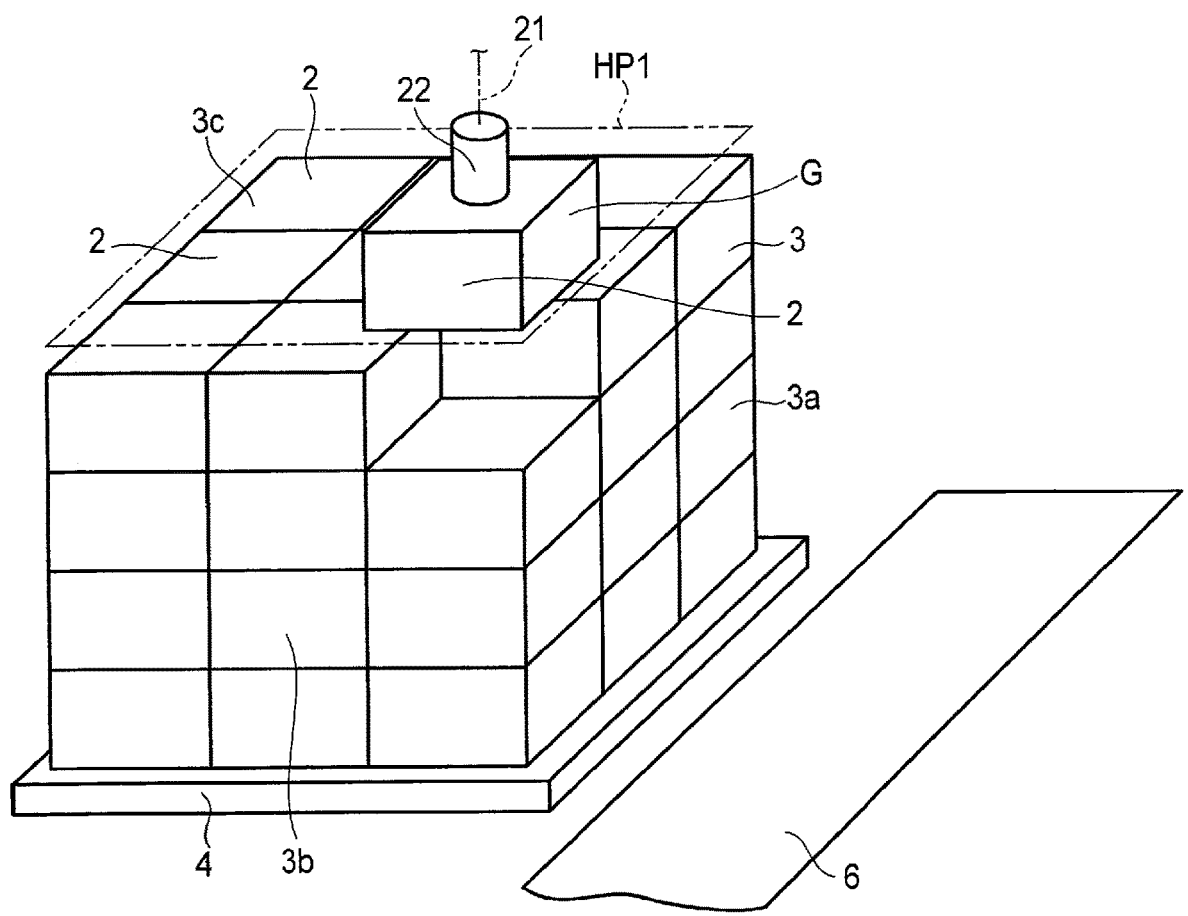
F I G. 9

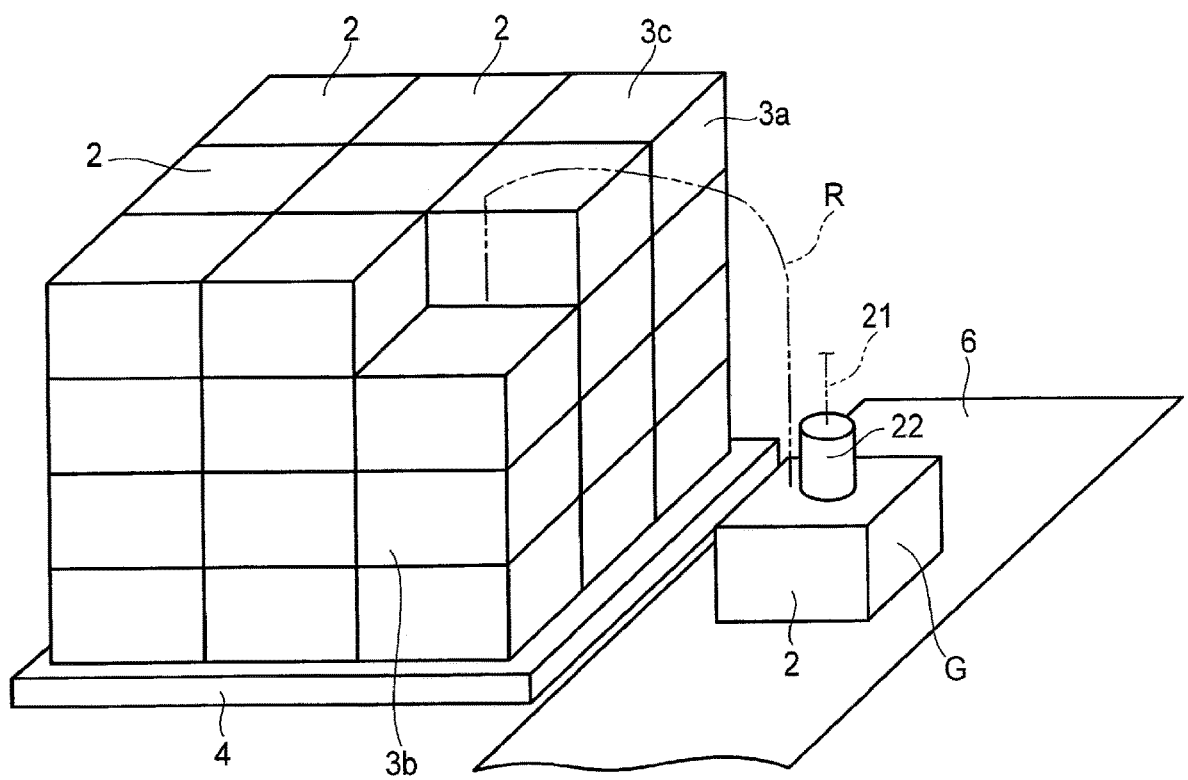
F I G. 10

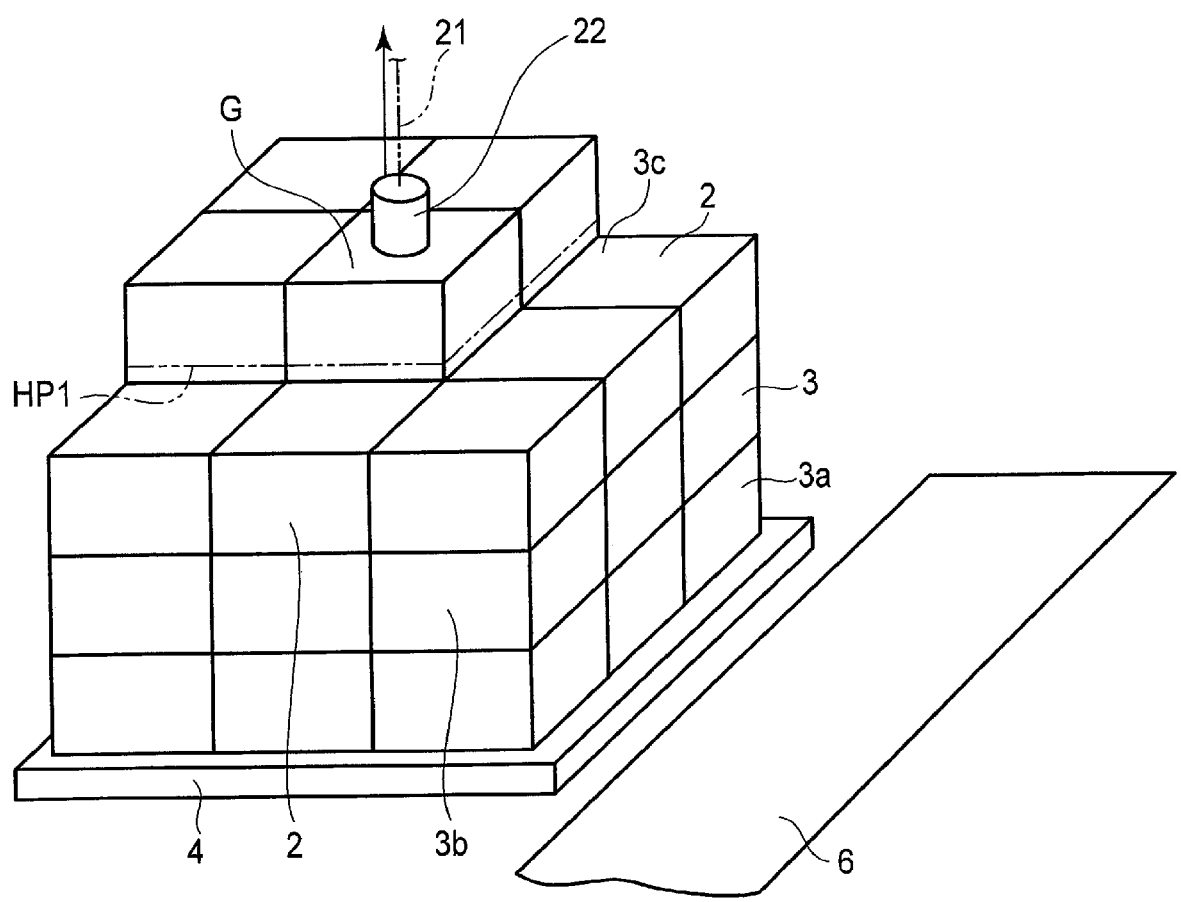
F I G. 12

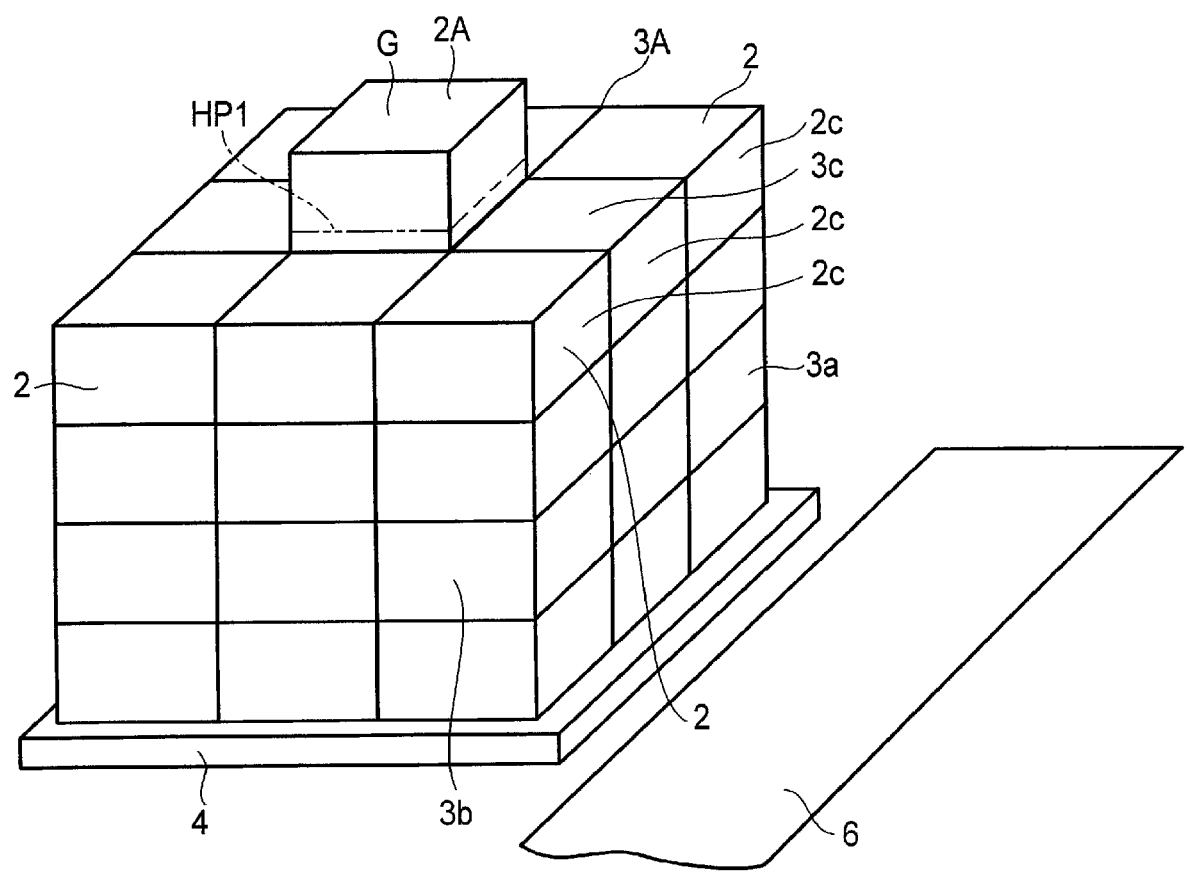
F I G. 13

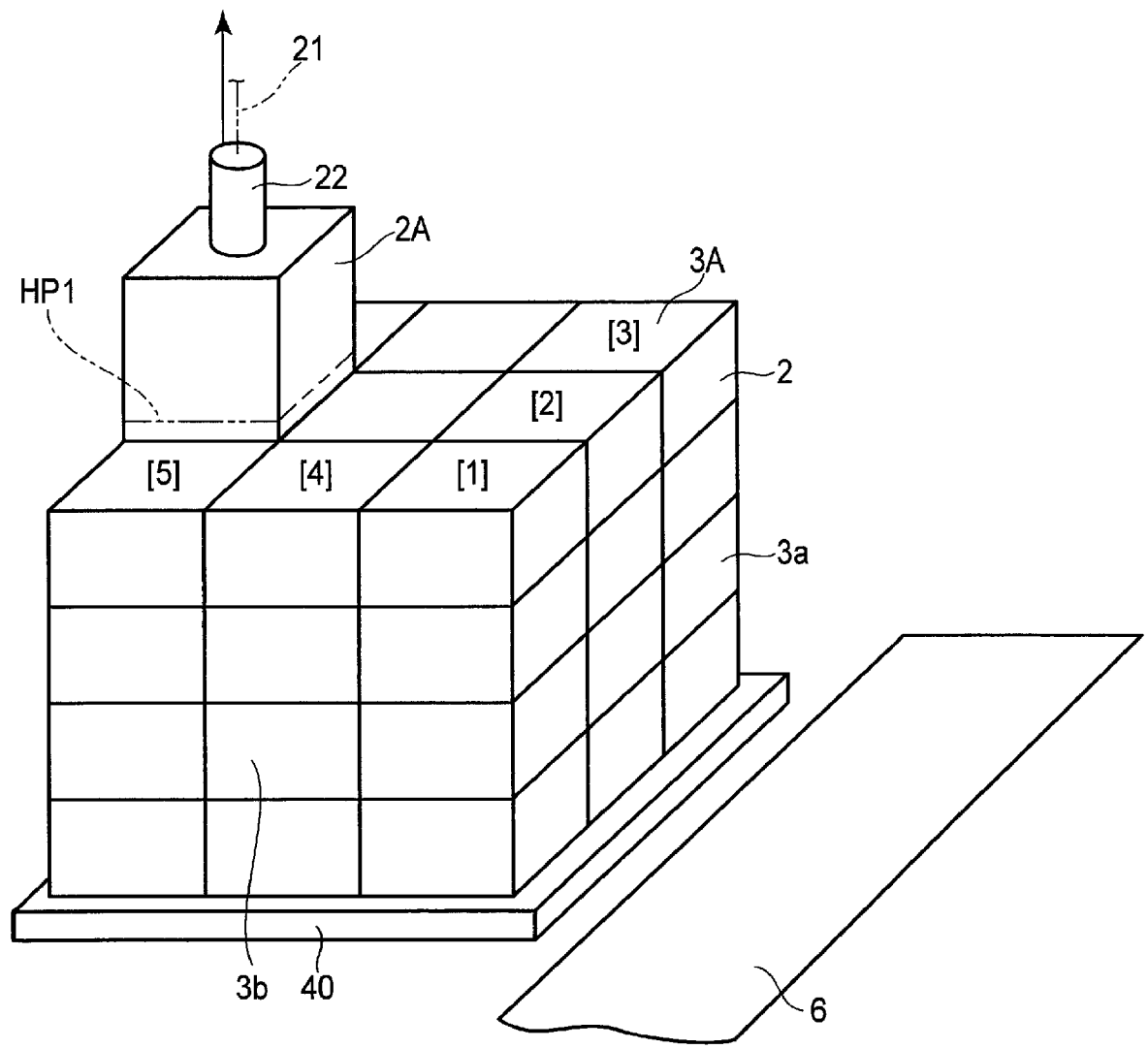
F I G. 14A

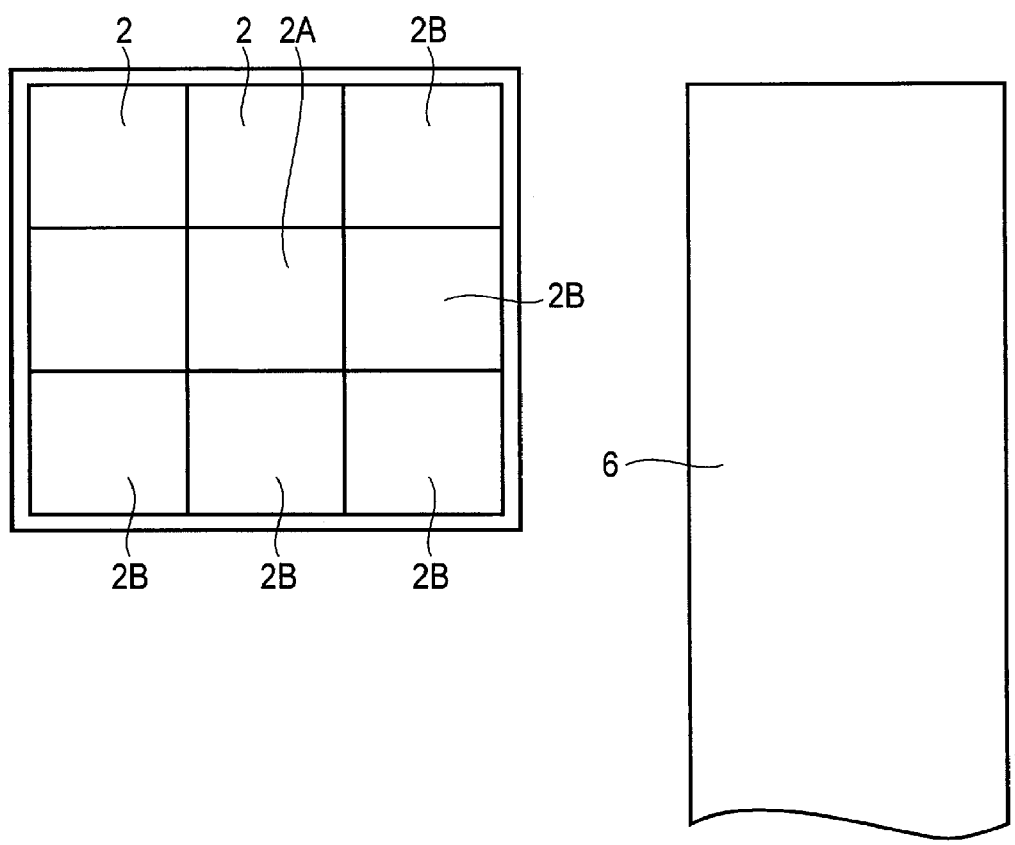
F I G. 14B

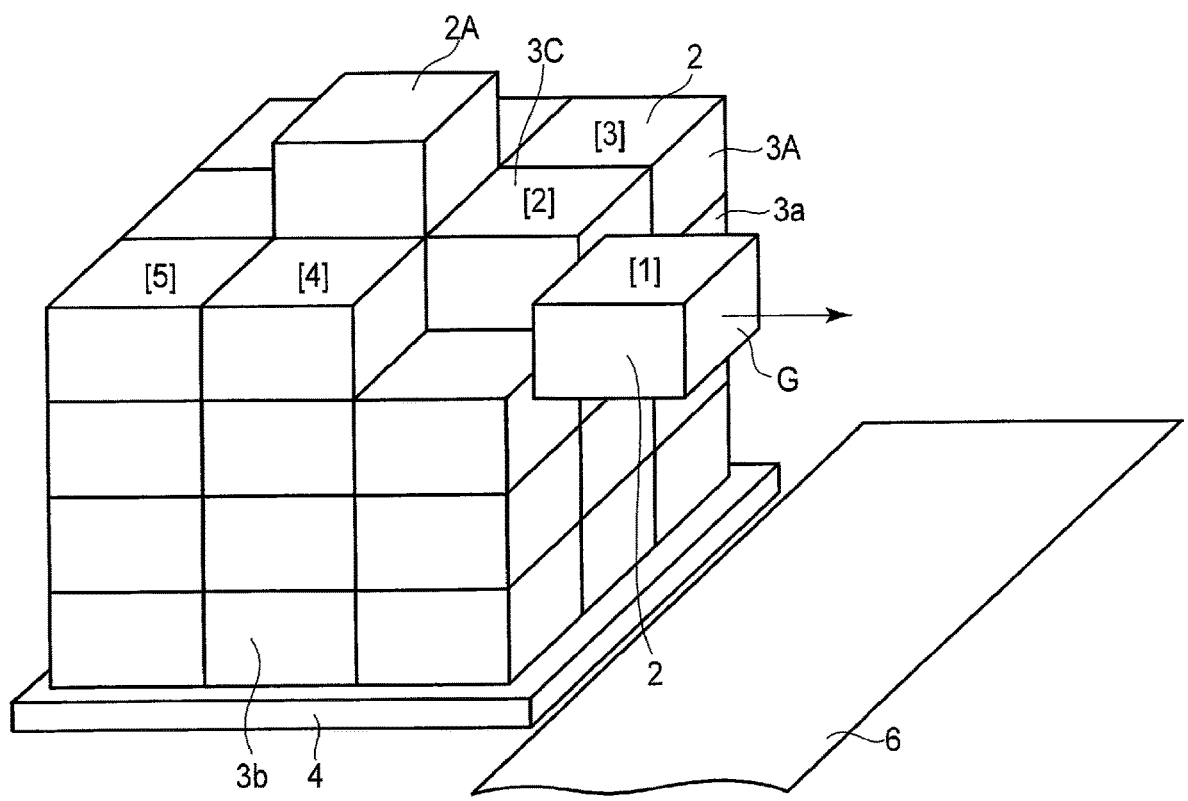
F I G. 15

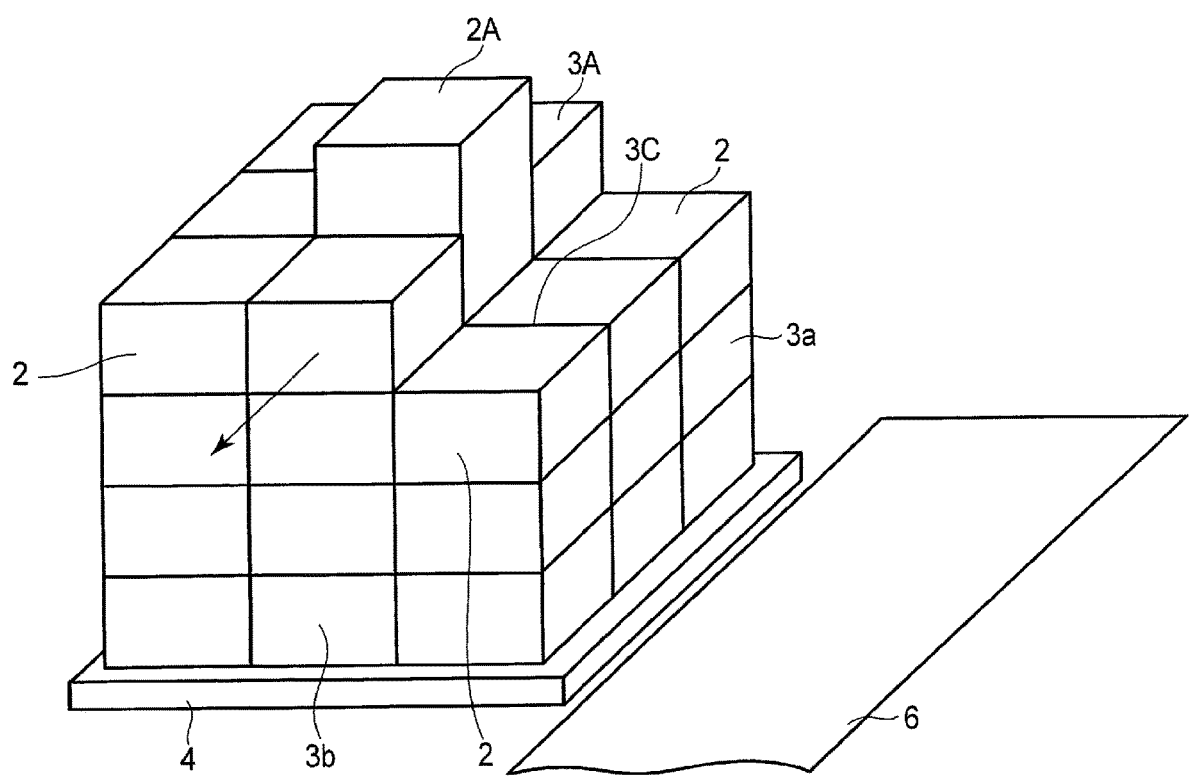
F I G. 16

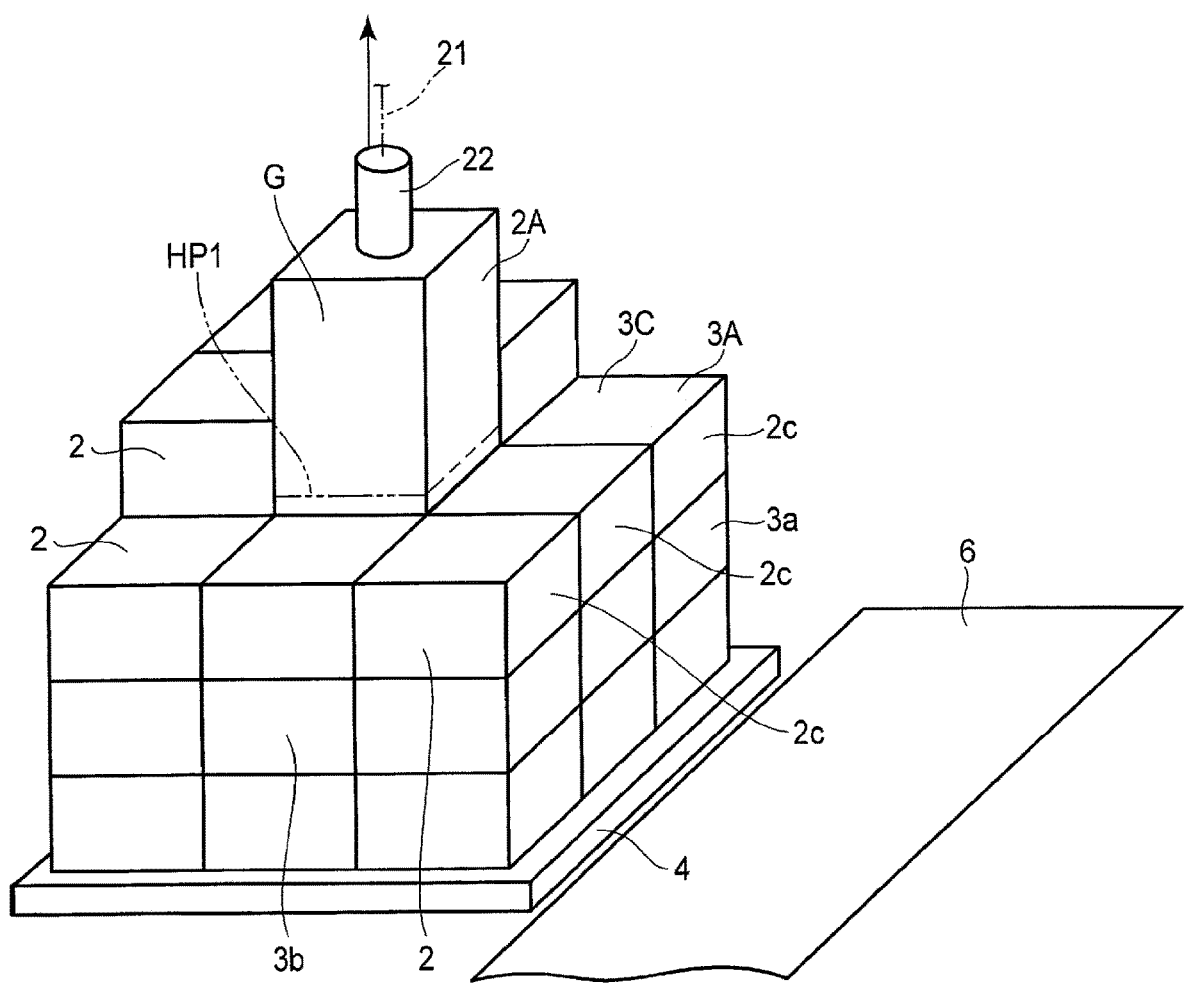
F I G. 17

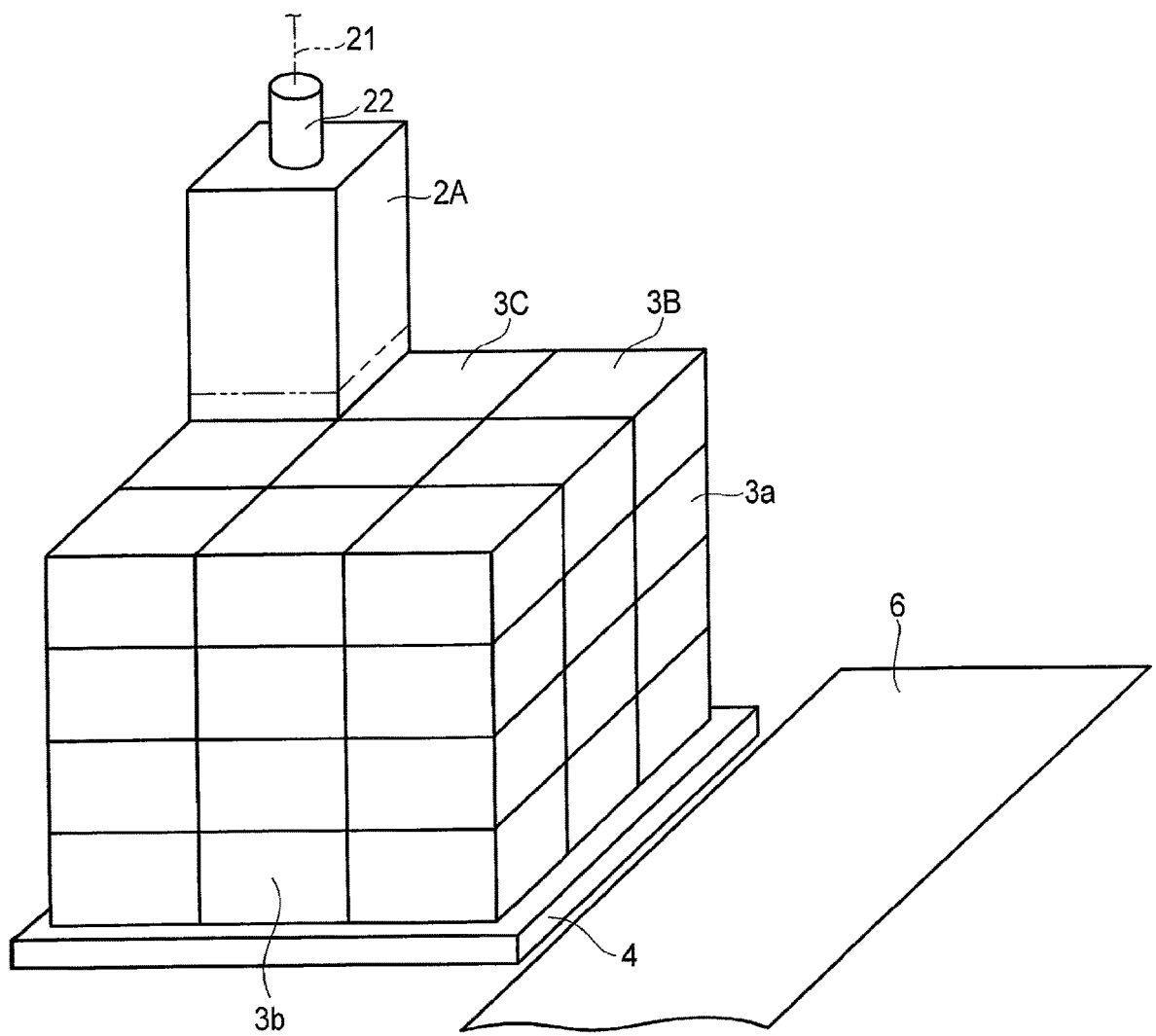
F I G. 20

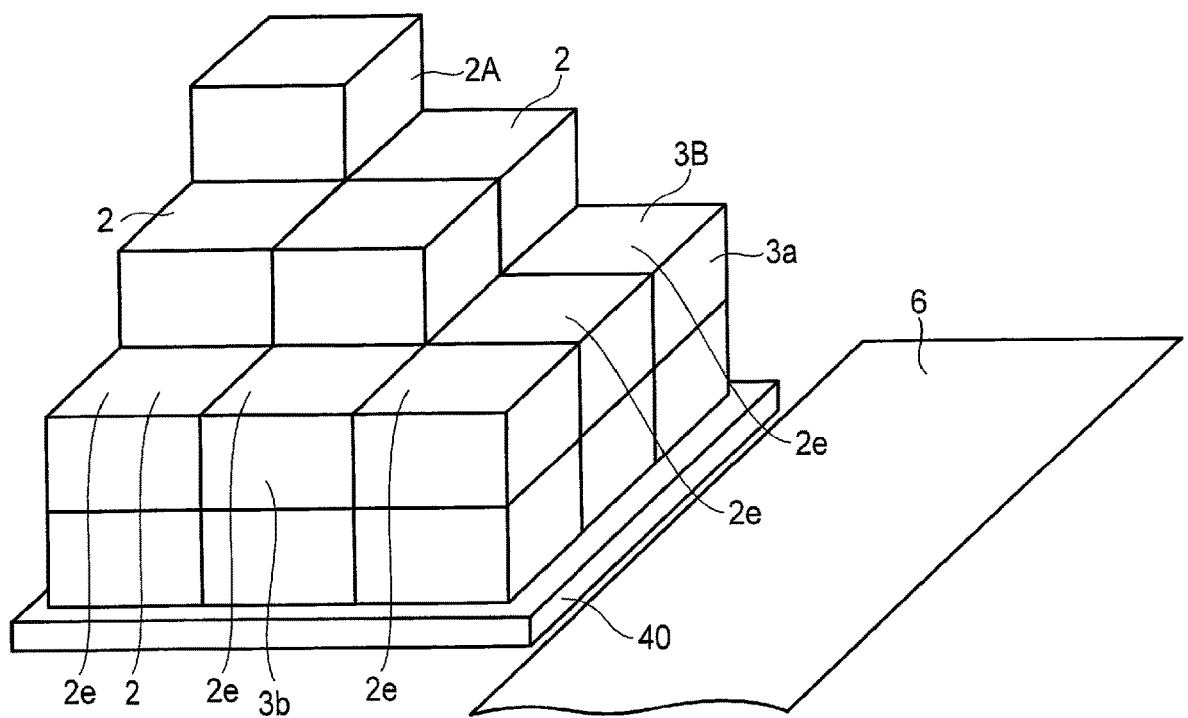
F I G. 21

CARGO HANDLING APPARATUS AND OPERATION METHOD THEREOF

CROSS-REFERENCE TO RELATED APPLICATION

This application is based upon and claims the benefit of priority from Japanese Patent Application No. 2017-114507, filed Jun. 9, 2017; the entire contents of which are incorporated herein by reference.

FIELD

Embodiments described herein relate generally to a cargo handling apparatus that transfers each of a plurality of cargoes included in a cargo group, and a method of operating the cargo handling apparatus.

BACKGROUND

In physical distribution warehouses, cargoes such as merchandise are stored and the stored cargoes are carried out to the outside as appropriate. In warehouses of this type, a cargo handling apparatus may be used in order to move cargoes to a storage shelf, a conveyance conveyor, etc. A known cargo handling apparatus includes a robot arm and a holding unit such as an absorbing unit provided in a distal end of the robot arm to hold cargoes.

A plurality of cargoes are conveyed to a cargo handling apparatus while being stacked on a pallet. The cargo handling apparatus photographs a cargo group on the pallet with a camera from above, detects respective positions of cargoes based on photography information, holds cargoes one by one, and loads a held cargo on a conveyor or a storage shelf.

BRIEF DESCRIPTION OF THE DRAWINGS

FIG. 8 is a perspective view showing how a cargo is moved from the cargo group.

FIG. 9 is a perspective view showing how a cargo is moved from the cargo group.

FIG. 10 is a perspective view showing how a cargo is moved from the cargo group.

FIG. 12 is a perspective view showing how a cargo is moved from the cargo group.

FIG. 13 is a perspective view showing how a cargo is moved from the cargo group.

FIG. 14A is a perspective view showing how a cargo is moved from the cargo group.

FIG. 14B is a plane view showing a portion of the conveyance system.

FIG. 15 is a perspective view showing how a cargo is moved from the cargo group.

FIG. 16 is a perspective view showing how a cargo is moved from the cargo group.

FIG. 17 is a perspective view showing how a cargo is moved from the cargo group.

FIG. 20 is a perspective view showing how a cargo is moved from the cargo group.

FIG. 21 is a perspective view showing how a cargo is moved from the cargo group.

DETAILED DESCRIPTION

According to embodiments, a cargo handling apparatus that transfers each cargo of a plurality of cargoes included in a cargo group to a destination location. The cargo handling apparatus includes a first detecting unit, a target setting unit, a determination height position setting unit, a moving apparatus, a second detecting unit, and a controller unit.

The first detecting unit detects height positions of the cargoes forming an upper surface of the cargo group with respect to a reference position. The target setting unit sets a cargo positioned in a highest position of the cargo group to a target based on a detection result by the first detecting unit, or if it is determined based on a detection result by the first detecting unit that the upper surface has no height difference, sets any one of the cargoes, forming a portion of the upper surface to the target.

The determination height position setting unit sets, based on a detection result by the first detecting unit, a determination height position to a position higher by a predetermined distance than an upper end of a cargo positioned in a second highest position after the target with respect to the reference position, among the cargoes that face to the destination location and are positioned closer to the destination location as compared to the target, or if it is determined based on a detection result by the first detecting unit that the upper surface has no height difference, sets the determination height position to a position higher by the predetermined distance than the upper surface.

The moving apparatus is operable to hold the target and move the held target in a vertical direction and to move the held target in a horizontal direction.

The second detecting unit detects information on a vertical movement of the target. The controller unit moves the target upward by driving the moving apparatus, and if it is determined based on a detection result by the second detecting unit that the target does not exceed the determination height position within a movable range of the moving apparatus, determines that pull-out of the target is impossible, and stops an operation of the moving apparatus so as to stop a movement of the target.

Figure 1:
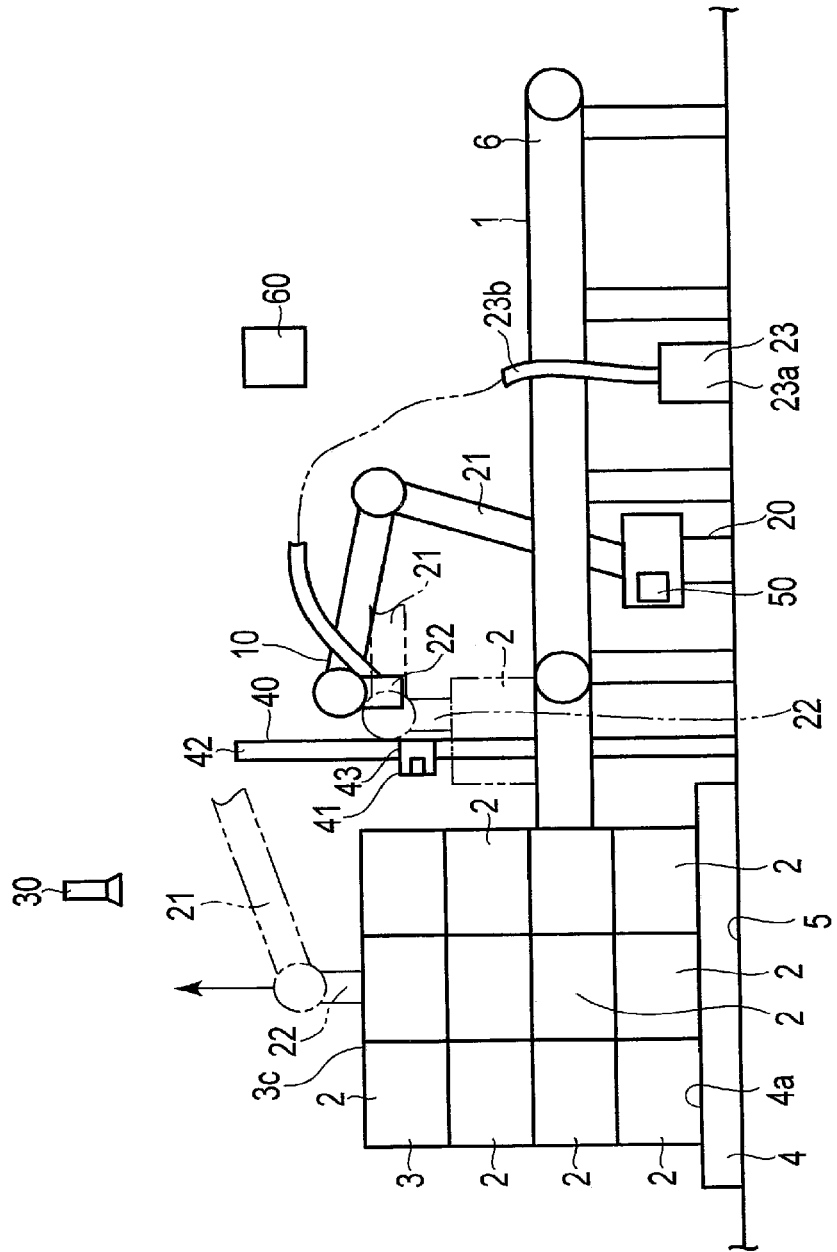
FIG. 1 is a side view showing a conveyance system including a cargo handling apparatus according to an embodiment.
Figure 2:
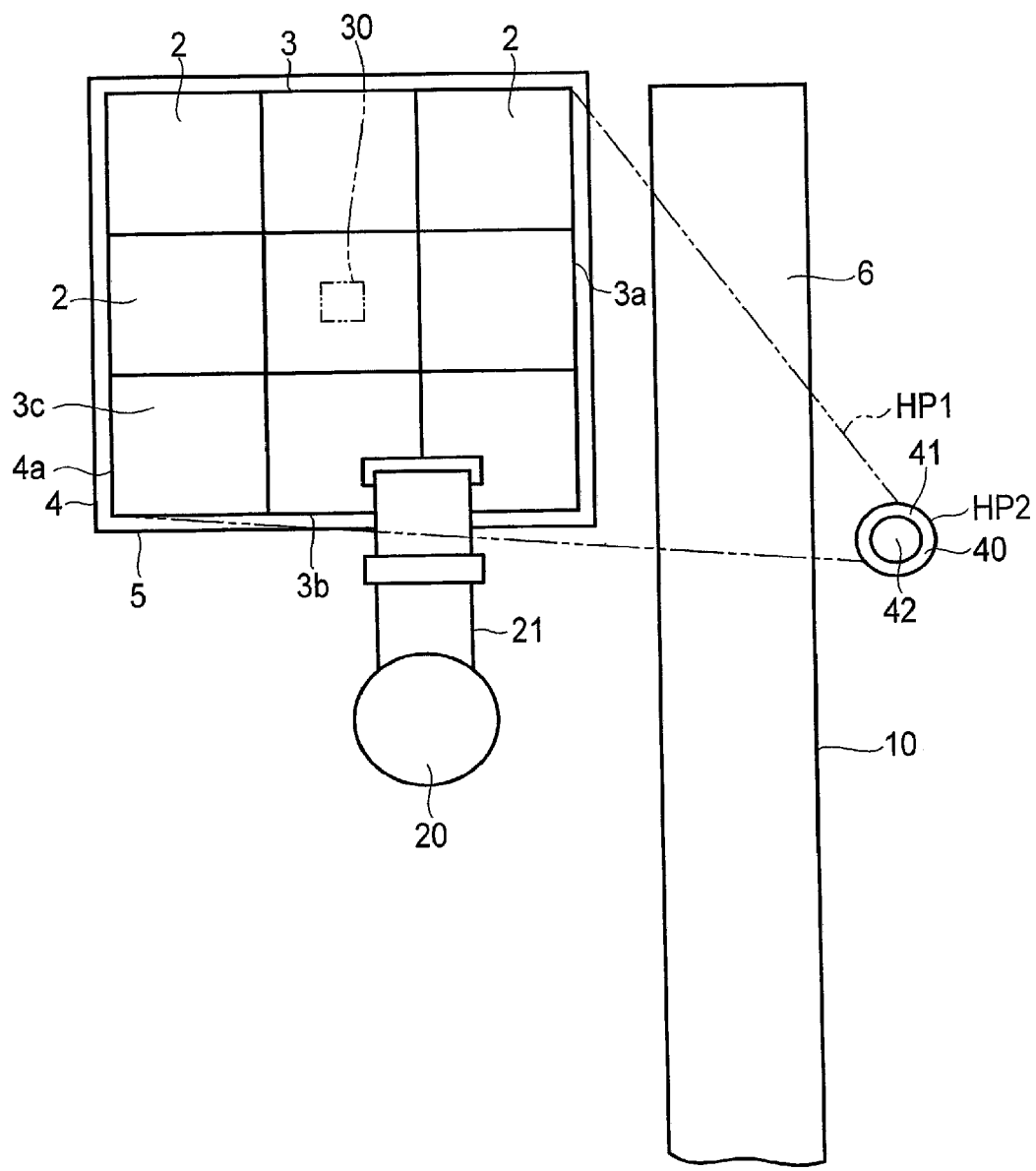
FIG. 2 is a plane view showing a portion of the conveyance system.
Figure 3:
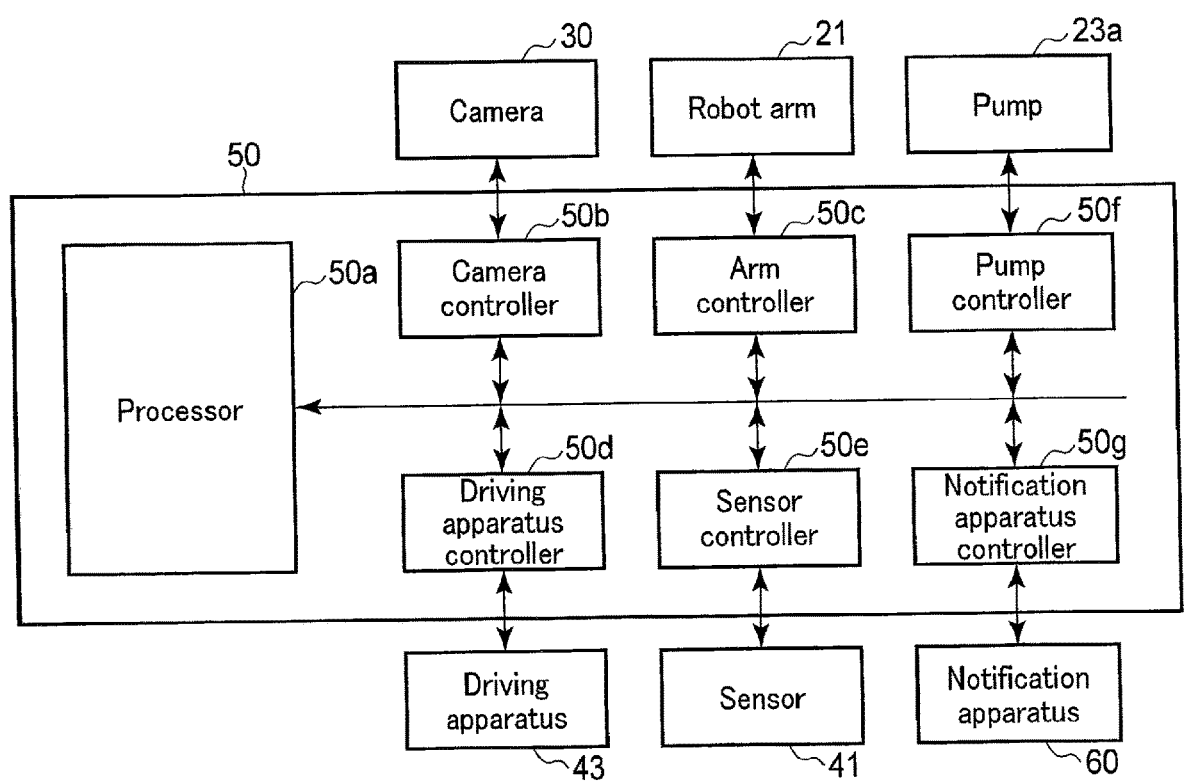
FIG. 3 is a block diagram showing a configuration of the cargo handling apparatus.

Hereinafter, a conveyance system 1 including a cargo handling apparatus 10 according to an embodiment will be described with reference to FIGS. 1 to 21. FIG. 1 is a side view showing the conveyance system 1. FIG. 2 is a plane view showing the conveyance system 1. FIG. 3 is a block diagram showing a configuration of the cargo handling apparatus 10.

The conveyance system 1 is configured to convey respective cargoes 2 forming a cargo group 3 to another location.

That is, the cargo group 3 includes the plurality of cargoes 2. In the present embodiment, as an example, the conveyance system 1 is installed in a warehouse in which the cargoes 2 are stored. As an example, each of the cargoes 2 has a rectangular parallelepiped shape or a cubic shape. The cargo group 3 is stacked on a pallet 4. The cargo group 3 is formed by stacking the cargoes 2 on the pallet 4. As an example, the cargo group 3 is formed in a rectangular parallelepiped shape or a cubic shape. The pallet 4 is arranged in a predetermined arrangement position 5 by means of a forklift, etc. In the pallet 4, a stacking surface 4a on which the cargo group 3 is stacked is formed as a plane. When the pallet 4 is arranged in the arrangement position 5, the stacking surface 4a forms into a horizontal plane perpendicular to the vertical direction. In the present embodiment, as an example, the stacking surface 4a of the pallet 4 functions as a reference position for a height position of the cargo group 3. In another example, a reference position may be set to a floor on which the cargo handling apparatus 10 is installed.

As shown in FIGS. 1 to 3, the conveyance system 1 includes a conveyor 6 configured to convey the cargoes 2, the cargo handling apparatus 10 configured to move the respective cargoes 2 from the cargo group 3 stacked on the pallet 4 to the conveyor 6, and a notification apparatus 60. The conveyor 6 is one example of destination locations to which the cargo handling apparatus 10 moves cargoes.

The conveyor 6 is, for example, a belt conveyor. The conveyor 6 has its end installed on a side of the arrangement position 5 in which the pallet 4 is arranged. When the cargo group 3 is in an initial state on the pallet 4 arranged in the arrangement position 5, the conveyor 6 faces to two surfaces 3a and 3b of the peripheral surfaces of the cargo group 3, excluding an upper surface 3c and a lower surface. The initial state of the cargo group 3 indicates a state before the cargoes 2 are moved out. In the present embodiment, the surfaces 3a and 3b form into planes parallel to the vertical direction while the cargo group 3 is in the initial state. When the respective cargoes 2 are moved, the cargo group 3 changes its shape accordingly. This changes the shape of the surfaces 3a and 3b from a plane.

The cargo handling apparatus 10 includes a moving apparatus 20, a camera (first detecting unit) 30, a pull-out detecting apparatus 40, and a controller unit 50. The moving apparatus 20 is configured to move the respective cargoes 2 from the cargo group 3 to the conveyor 6. The camera 30 photographs the cargo group 3 from above. The pull-out detecting apparatus 40 is configured to detect pull-out of the respective cargoes 2 from the cargo group 3. The controller unit 50 controls operations of the moving apparatus 20 based on photography information by the camera 30 and detection information by the pull-out detecting apparatus 40.

The moving apparatus 20 is installed in a position that faces to the cargo group 3 on the pallet 4 arranged in the arrangement position 5, and also faces to the conveyor 6, as shown in FIG. 2. That is, the moving apparatus 20 is installed in a position surrounded by the arrangement position 5 and the conveyor 6. The moving apparatus 20 may be fixed to an installation position or may be movable within a predetermined range.

The moving apparatus 20 is operable to hold the respective cargoes 2, to move the held cargo 2 in the vertical direction, that is, in the direction of gravity action and the other direction, and to move the held cargo 2 in the horizontal direction, that is, in the direction orthogonal to the direction of gravity action. The horizontal direction includes every direction within the range of 360 degrees.

As shown in FIG. 1, as an example, the moving apparatus 20 includes a six-axis robot arm 21, an absorbing unit 22, and a negative pressure generating apparatus 23. The absorbing unit 22 is provided in a distal end of the six-axis robot arm 21. The negative pressure generating apparatus 23 exerts a negative pressure on the absorbing unit 22.

The six-axis robot arm 21 is fixed on a floor, for example. The six-axis robot arm 21 is operable to move the held cargo 2 in the vertical direction, and to move the held cargo 2 in the horizontal direction (360 degrees). In addition, the six-axis robot arm 21 is configured to move the held cargo 2 to the conveyor 6 along a path calculated by the controller unit 50.

The absorbing unit 22 is configured to absorb one of the cargoes 2 by a negative pressure generated by the negative pressure generating apparatus 23. The absorbing unit 22 holds the cargo 2 by absorbing it. The absorbing unit 22 is formed in a cylindrical shape, for example. The absorbing unit 22 is connected to a pipe 23b of the negative pressure generating apparatus 23.

The negative pressure generating apparatus 23 includes a pump 23a and the pipe 23b connected to the pump 23a. The pump 23a is configured to be controllable by the controller unit 50. The pipe 23b is connected to the absorbing unit 22. The pipe 23b exerts on the absorbing unit 22, a negative pressure generated by the pump 23a. As an example, the pipe 23b is arranged outside the six-axis robot arm 21. In another example, the pipe 23b may be arranged inside the six-axis robot arm 21.

As described above, in the present embodiment, the moving apparatus 20 is configured to hold each of the cargoes 2 by the absorbing unit 22 and the negative pressure generating apparatus 23. However, holding of the cargo 2 is not limited to absorption by the absorbing unit 22 and the negative pressure generating apparatus 23. In another example, the cargo handling apparatus 10 may hold each of the cargoes 2 with a nipping unit configured to hold each of the cargoes 2 by nipping it. In this example, each of the cargoes 2 can be nipped and held by a robot hand.

The camera 30 is configured to detect the plurality of cargoes 2 forming the upper surface 3c of the cargo group 3 and to detect each of height positions of the cargoes 2 forming the upper surface 3c, with respect to the stacking surface 4a of the pallet 4 as a reference position. Regarding the cargoes 2 forming the upper surface 3c, the camera 30 detects their positions in planar view. Examples of the camera 30 include a 3D camera. The camera 30 is fixed above the arrangement position 5 in which the pallet 4 is arranged. For example, the camera 30 may be fixed to a ceiling of a warehouse or to a stationary unit such as a pole fixed to a floor of the warehouse. An installation position for the camera 30 is set in a manner so that the camera 30 can photograph the entire region of at least an upper surface of the pallet 4 arranged in the arrangement position 5. The capability of photographing the entire region of at least the upper surface of the pallet 4 enables the camera 30 to photograph the entire region of the upper surface 3c of the cargo group 3 on the pallet 4 arranged in the arrangement position 5. The camera 30 is not limited to a single camera. For example, the entire region of at least the upper surface of the pallet 4 may be photographed with a plurality of cameras 30. In addition, the camera 30 may be installed in a manner to be movable in at least one of the vertical direction and the horizontal direction.

The camera 30 may be configured in a manner to detect a length in the vertical direction of a portion of each cargo 2, which is exposed to the outside. This portion of the cargo 2, exposed to the outside indicates a portion whose periphery is not covered with any of the other cargoes 2, and which can be photographed with the camera 30. The camera 30 transmits photography information to the controller unit 50. The camera 30 is one example of the detecting unit configured to detect the plurality of cargoes 2 forming the upper surface 3c of the cargo group 3 and to detect height positions of the cargoes 2 forming the upper surface 3c. Other devices such as a sensor, for example, may be used.

The pull-out detecting apparatus 40 is configured to detect upward pull-out of each cargo 2 from the cargo group 3. Herein, detecting pull-out means detecting whether or not any of the cargoes 2 exceeds a determination height position HP1 to be described later.

The pull-out detecting apparatus 40 includes, for example, a sensor (second detecting unit) 41, a guide rail 42, and a driving apparatus 43. The sensor 41 is configured to detect a distance to an object such as the cargo 2. The guide rail 42 guides the vertical movement of the sensor 41. The driving apparatus 43 moves the sensor 41 along the guide rail 42 and selectively fixes the sensor 41 to the guide rail 42.

Examples of the sensor 41 include a laser range finder. The sensor 41 is configured to detect a distance to the cargo 2 facing to the conveyor 6. The sensor 41 may be a sensor other than a laser range finder, which is configured to detect a distance to an object such as the cargo 2. Herein, the cargo 2 facing to the conveyor 6 means a cargo which is at least partially not covered with any of the other cargoes 2 when viewed from the conveyor 6 along the horizontal direction. A position of the sensor 41 will be described below.

In the present embodiment, when the cargo group 3 is in the state where even a single cargo 2 is not moved out yet, that is, in the initial state, the surface 3a of the peripheral surfaces excluding the upper surface 3c and the lower surface faces to the conveyor 6. With the cargoes 2 arranged in the surface 3a in the initial state, no other cargo 2 exists on the conveyor 6. Furthermore, with the cargo group 3 in the initial state, the surface 3b of the peripheral surfaces is opposed to the six-axis robot arm 21; however, no other cargo 2 exists on the conveyor 6 in the horizontal direction. Therefore, the sensor 41 is arranged in a position in which the sensor 41 can detect distances to the cargoes 2 arranged in the surfaces 3a and 3b of the cargo group 3 in the initial state.

When the cargoes 2 which are arranged in the surface 3a or 3b in the initial state are moved out, the cargoes 2 which are arranged behind the surface 3a or 3b of the cargo group 3 in the initial state, that is, the cargoes 2 which are surrounded by the other cargoes 2 in the initial state, form a portion of the new surface 3a or 3b. These cargoes 2 forming the new surface 3a or 3b are detectable by the sensor 41 because they are at least partially exposed to the conveyor 6 in the horizontal direction. As described, the sensor 41 is arranged in a position in which the sensor 41 can detect the cargoes 2 arranged in the surface 3a or 3b of the cargo group 3 in the initial state. This arrangement enables the sensor 41 to detect the cargoes 2 forming the surface 3a or 3b, which is changing each time. As an example, the sensor 41 is arranged on the opposite side of the arrangement position 5 with the conveyor 6 interposed between the sensor 41 and the arrangement position 5. That is, the guide rail 42 is installed in this position. The sensor 41 has a detection range within a horizontal plane in which the sensor 41 is installed, to the extent that the sensor 41 can detect distances to all of the cargoes 2 arranged in this horizontal plane.

As described, the present embodiment adopts the sensor 41 as an example of the detecting unit that detects information on the vertical movement of the cargoes 2 facing to the conveyor 6. Information on a distance to each cargo 2 detected by the sensor 41 changes as this cargo is vertically moved. Specifically, when the cargo 2 is vertically moved beyond the detection range of the sensor 41, a distance to this cargo 2 is no longer detectable. That is, a detection result changes. This change corresponds to information on the vertical movement of any of the cargoes 2. The sensor 41 transmits detected information to the controller unit 50.

The detecting unit that detects information on the vertical movement of the respective cargoes 2 facing to the conveyor 6 is not limited to the sensor 41 (laser range finder). Instead of the sensor 41, a camera may be used. A camera can photograph the cargoes 2 facing to the conveyor 6 by photographing the surfaces 3a and 3b of the cargo group 3. The camera can photograph how the cargoes 2 facing to the conveyor 6 move in the vertical direction. Therefore, photography information photographed by the camera corresponds to information on the vertical movement of the respective cargoes 2 facing to the conveyor 6.

As an example, the driving apparatus 43 is formed integrally with the sensor 41. The sensor 41 is vertically moved as the result of the vertical movement of the driving apparatus 43 along the guide rail 42. Furthermore, the driving apparatus 43 is configured to selectively fix the sensor 41 to the guide rail 42. Operations of the driving apparatus 43 are controlled by the controller unit 50.

As an example, the guide rail 42 is provided with a rack while the driving apparatus 43 includes a pinion and a motor. The pinion meshes with the rack and the motor drives the pinion. As described, the rack and the pinion enable the driving apparatus 43 to vertically move along the guide rail 42. A configuration for making the sensor 41 vertically move and selectively fixable is not limited to the configuration including the rack and the pinion.

The controller unit 50 may be fixed to the six-axis robot arm 21, as shown in FIG. 1, or may be arranged in a position different from the moving apparatus 20. As shown in FIG. 3, the controller unit 50 includes a processor 50a, a camera controller 50b, an arm controller 50c, a driving apparatus controller 50d, a sensor controller 50e, a pump controller 50f, and a notification apparatus controller 50g. The camera controller 50b controls operations of the camera 30. The arm controller 50c controls operations of the six-axis robot arm 21. The driving apparatus controller 50d controls operations of the driving apparatus 43. The sensor controller 50e controls operations of the sensor 41. The pump controller 50f controls operations of the pump 23a. The notification apparatus controller 50g controls operations of the notification apparatus 60.

The controller unit 50 includes functions 1 to 16 described below.

The function 1 causes the camera controller 50b to drive the camera 30 to perform photography.

The function 2 causes the processor 50a to detect the cargo 2 positioned in the highest position of the cargoes 2 of the cargo group 3 based on photography information by the camera 30, to set this cargo 2 to target G, or to set any one of the cargoes 2 forming the upper surface 3c to target G if it is determined based on the photography information by the camera 30 that the upper surface 3c of the cargo group 3 has no height difference. A cargo positioned in the highest position has its upper end arranged in the highest position. In the present embodiment, since the cargoes 2 have a cubic shape or a rectangular parallelepiped shape, the upper end of each of the cargoes 2 corresponds to the upper surface.

In addition, a threshold value may be used for the determination of the presence or absence of a height difference. When a height difference is equal to or less than a threshold value, it is determined that there is no height difference. This threshold value is set in a manner so that it is determined that there is no height difference even if, for example, a height difference is caused by a slight difference in size between the cargoes 2 or deformation of the cargoes 2.

The function 3 causes the processor 50a to calculate a path for moving the cargo 2 set to the target G to the conveyor 6. In the present embodiment, as an example, the function 3 is to calculate the shortest path for moving the target G to the conveyor 6. The shortest path mentioned herein is determined in consideration of functions, operating limits, etc., of the moving apparatus 20. The controller unit 50 holds information on functions, operating limits, etc., of the moving apparatus 20. Information on operating limits of the moving apparatus 20 pertains to an upward movement limit position, a horizontal movement limit position, etc.

The function 4 causes the arm controller 50c to control the six-axis robot arm 21 in a manner to horizontally move the target G to a position which does not overlap with the cargo group 3 at least in the vertical direction when the processor 50a determines based on photography information by the camera 30 that the target G forms the outermost periphery facing to the conveyor 6 (destination location) in a plane view of the cargo group 3 and also forms the upper surface 3c.

The function 5 causes the processor 50a to detect, based on photography information by the camera 30, the cargo 2 positioned in the second highest position after the target G among the cargoes 2 that face to the conveyor 6 and are positioned closer to the conveyor 6 as compared to the target G, to set a determination height position HP1 to a position higher by a predetermined distance than the upper end, that is, the upper surface of this detected cargo 2, or to set the determination height position HP1 to a position higher by a predetermined distance from the upper surface 3c if it is determined based on the photography information by the camera 30 that the upper surface 3c of the cargo group 3 has no height difference. The predetermined distance mentioned herein is a distance to the extent that the target G, when it is moved, does not come in contact with the second highest cargo 2 after the target G among the cargoes of the cargo group 3, which face to the conveyor 6. Positioning closer to the conveyor 6 as compared to the target G means positioning in a position which is closer to the conveyor 6 as compared to the target G.

The function 6 causes the driving apparatus controller 50d to drive the driving apparatus 43 in a manner to move and fix the sensor 41 to a detection position HP2 in which the sensor 41 can detect a distance to the cargo 2 positioned in the determination height position HP1.

The function 7 causes the sensor controller 50e to drive the sensor 41.

The function 8 causes the arm controller 50c to control the operation of the six-axis robot arm 21.

The function 9 causes the pump controller 50f to control operations of the pump 23a.

The function 10 causes the processor 50a to determine based on detection information by the sensor 41, whether or not the lower end of the cargo 2 set to the target G exceeds the determination height position HP1.

The function 11 causes the processor 50a to determine based on detection result by the sensor 41, that pull-out of the target G is impossible in the case where the target G does not exceed the determination height position HP1 at the time when the moving apparatus 20 moves the target G upward to a maximum.

When it is determined with the function 10 that pull-out of the target G is impossible, the function 12 causes the processor 50a to set to a target based on photography information by the camera 30, a cargo that forms the outermost periphery facing to the conveyor 6 (destination location) in a plane view of the cargo group 3 and also forms the upper surface 3c.

The function 13 causes the arm controller 50c to control the six-axis robot arm 21 in a manner to horizontally move the target G set with the function 11, to a position which does not overlap with the cargo group 3 at least in the vertical direction.

After the target G is moved with the function 11, the function 14 causes the processor 50a to detect the highest cargo 2 again, and set this highest cargo 2 to the target G.

When the processor 50a determines the impossibility of pull-out with respect to a cargo 2 once, the function 15 causes the arm controller 50c to return this cargo 2 thus determined to its initial position.

When the processor 50a determines the impossibility of pull-out with respect to the same cargo 2 twice, the function 16 causes the notification apparatus controller 50g to drive the notification apparatus 60.

The notification apparatus 60 is configured to notify a worker, etc. Examples of the notification apparatus 60 include a lamp and a speaker. As the notification apparatus 60, what is already installed in a warehouse in which the conveyance system 1 is installed may be used.

Figure 4:
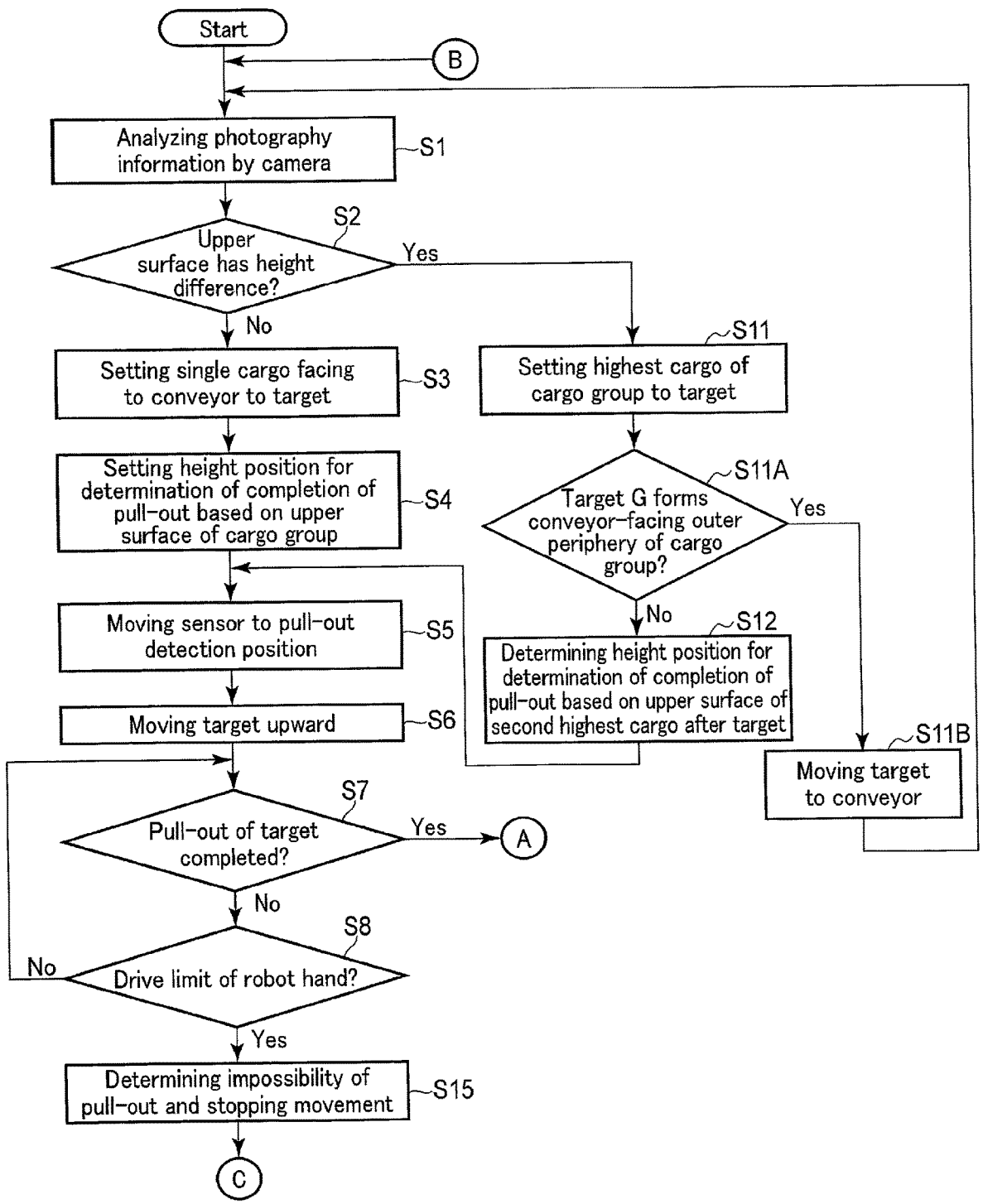
FIG. 4 is a flowchart showing operations of the conveyance system.
Figure 5:
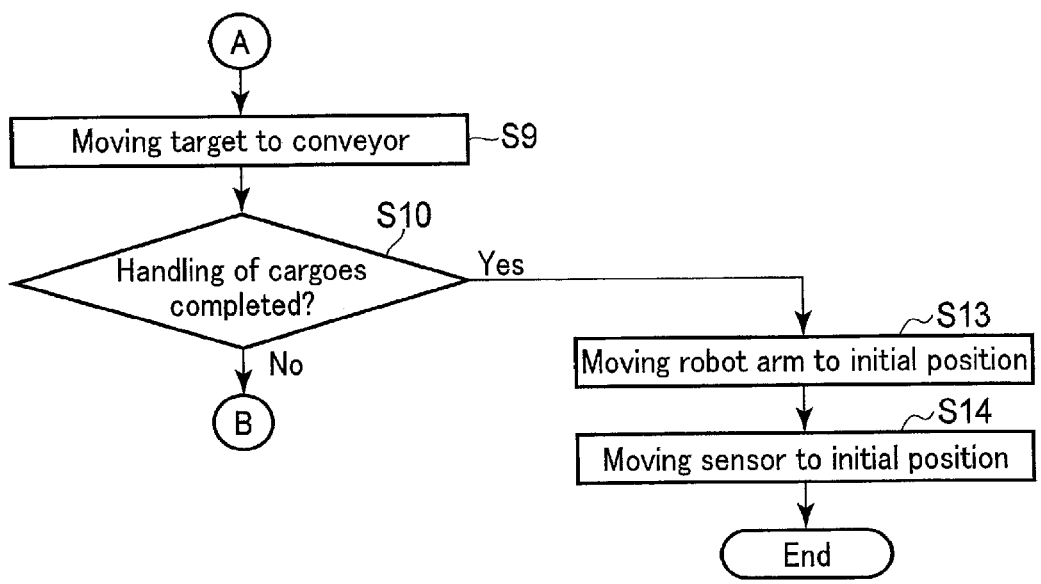
FIG. 5 is a flowchart showing operations of the conveyance system.
Figure 6:
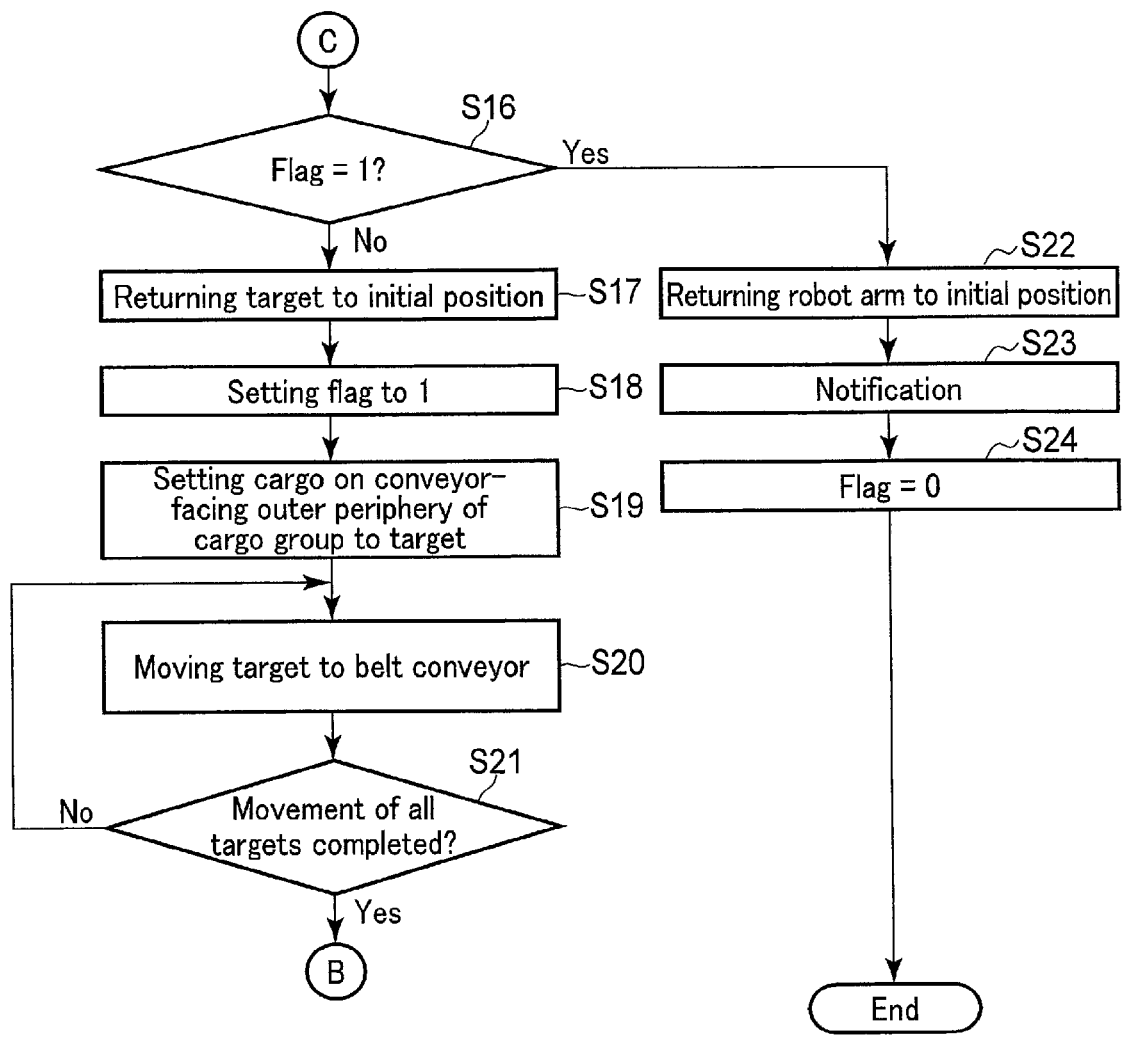
FIG. 6 is a flowchart showing operations of the conveyance system.

Next, operations of the conveyance system 1 will be described. FIGS. 4 to 6 are flowcharts showing operations of the conveyance system 1. As an example of the conveyance system 1, when a switch (not shown) is turned on, the conveyor 6 is driven so that the controller unit 50, the camera 30, and the pull-out detecting apparatus 40 are brought into a drivable state, and the operations shown in FIGS. 4 to 6 are performed. The controller unit 50 performs various controls with the functions 1 to 15 described above.

Figure 7:
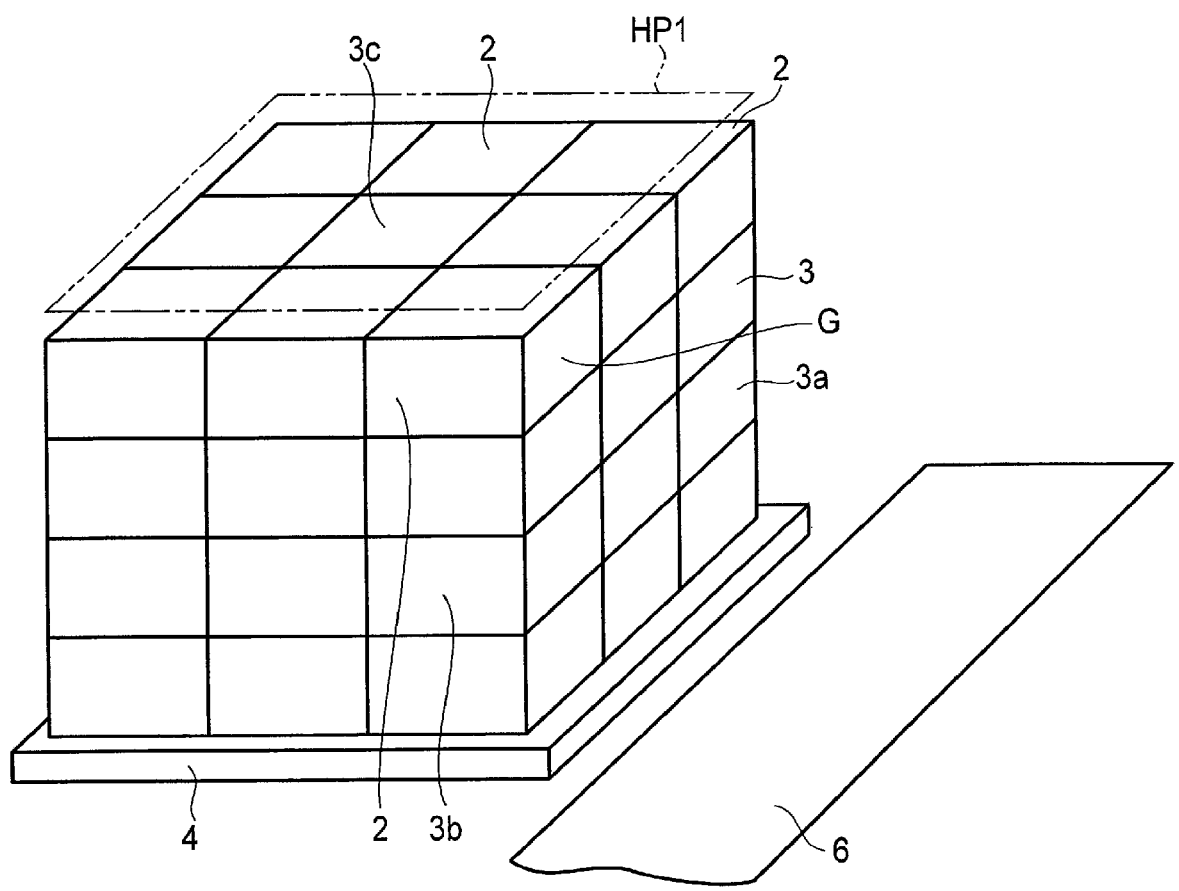
FIG. 7 is a perspective view showing how a cargo is moved from the cargo group.
Figure 11:
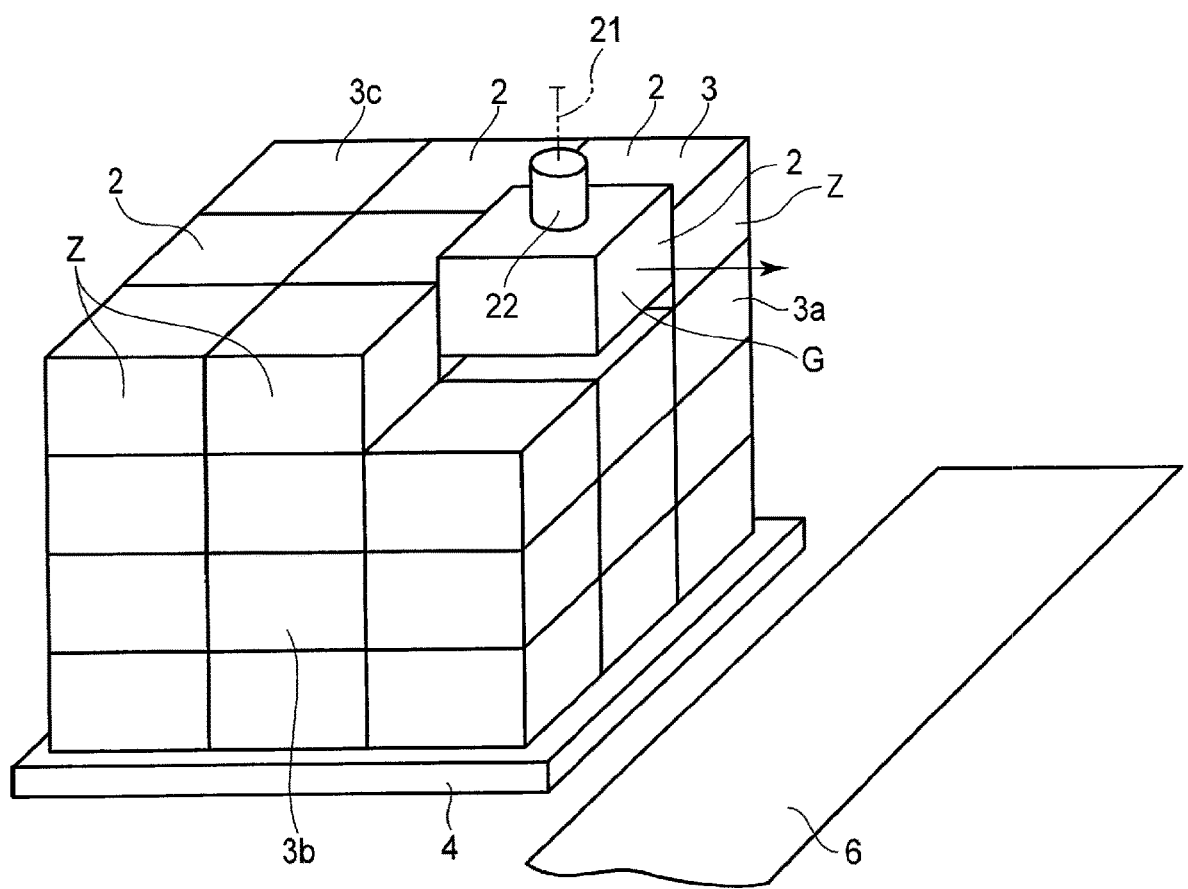
FIG. 11 is a perspective view showing how a cargo is moved from the cargo group.

Operations of the conveyance system 1 explained below are to convey the respective cargoes 2 from the cargo group 3 in which all the cargoes 2 have approximately the same shape and dimensions, and all the cargoes 2 arranged on the uppermost layer have their upper surfaces in the same height position. FIG. 7 is a perspective view showing the cargo group 3 in the initial state. FIGS. 8 to 12 are perspective views showing how the respective cargoes 2 are moved from the cargo group 3.

When the system is activated, the controller unit 50 analyzes photography information transmitted from the camera 30 (step S1) and determines whether or not there is a height difference in the upper surface 3c of the cargo group 3 (step S2). There is no height difference in the upper surface 3c in the case where the cargoes 2 on the uppermost layer of the cargo group 3 are arranged in a manner so that their upper surfaces are arranged at the same height. The upper surface 3c of the cargo group 3 has a height difference in the case where at least one of all the cargoes 2 arranged on the uppermost layer of the cargo group 3 is higher than the others.

As shown in FIG. 7, in the cargo group 3 in the initial state, the upper surfaces of all the cargoes 2 arranged on the uppermost layer are positioned in the same height position. Therefore, the controller unit 50 determines that the upper surface 3c of the cargo group 3 has no height difference ("NO" in step S2).

If it is determined that the upper surface 3c of the cargo group 3 has no height difference, the controller unit 50 sets to the target G, the single cargo 2 facing to the conveyor 6 among the cargoes 2 arranged on the uppermost layer (step S3). In the cargo group 3, the cargo 2 facing to the conveyor 6 is arranged in the surface 3a or 3b. In the case where the cargoes 2 arranged on the uppermost layer contain the plurality of cargoes 2 facing to the conveyor 6, the controller unit 50 sets the target G under a predetermined rule. As an example of a predetermined rule, the cargo 2 positioned close to the conveyor 6 and the six-axis robot arm 21 is set to the target G. In accordance with this example, the present embodiment sets the cargo 2 arranged in the surface 3a and the surface 3b to the target G.

When the target G is set, the controller unit 50 sets a position higher by a predetermined distance than the upper surface 3c of the cargo group 3 to the determination height position HP1 (step S4).

When the determination height position HP1 is set, the controller unit 50 moves to fix the sensor 41 to the detection position HP2 in which the sensor 41 can detect the presence or absence of any of the cargoes 2. Specifically, the controller unit 50 controls the driving apparatus 43 (step S5).

When the sensor 41 is fixed to the detection position HP2, the controller unit 50 drives the cargo handling apparatus 10 to move the target G upward (step S6).

As the operation in step S6, specifically, the controller unit 50 controls the six-axis robot arm 21 to bring a suction opening of the absorbing unit 22 in contact with the upper surface of the target G. When the suction opening of the absorbing unit 22 is brought in contact with the upper surface of the target G, the controller unit 50 drives the pump 23a of the negative pressure generating apparatus 23. By driving the negative pressure generating apparatus 23, the absorbing unit 22 absorbs the upper surface of the target G. If it is determined that the absorbing unit 22 has absorbed the upper surface of the target G based on, for example, detection information by a sensor that detects a pressure inside the pipe 23b, the controller unit 50 drives the six-axis robot arm 21 to move the target G upward, as shown in FIG. 8.

Based on detection information by the sensor 41, the controller unit 50 determines whether or not pull-out of the target G is completed (step S7). Explained below is one example of how the controller unit 50 determines whether or not pull-out of the target G is completed. As described above, the sensor 41 is a laser range finder, as an example.

No cargoes 2 exist in the determination height position HP1 until the target G reaches this determination height position HP1. Therefore, even if the determination height position HP1 is scanned, the sensor 41 ends up detecting a distance to something else that is positioned beyond the cargo group 3.

When the target G reaches the determination height position HP1, the sensor 41 detects a distance to the target G. If the target G exceeds the determination height position HP1, the sensor 41 detects a distance to something else positioned beyond the cargo group 3.

Therefore, in the case of determination that the upper surface 3c of the cargo group 3 has no height difference ("No" in step S2), when a distance between the sensor 41 and an object in the direction extending from the sensor 41 to the target G is changed twice, the controller unit 50 determines that pull-out of the target G is completed.

As described above, pull-out of the target G is determined based on a change in a detection result by the sensor 41. This is one example of how to determine whether the pull-out of the target G is completed or not. The controller unit 50 may use a detection result by the sensor 41 in any manner. The controller unit 50 periodically makes a determination in step S7.

If it is determined that pull-out of the target G is not completed ("No" in step S7), the controller unit 50 determines whether or not the six-axis robot arm 21 has reached a drive limit. That is, the controller unit 50 determines whether or not the target G is movable further upward (step S8).

If it is determined that the target G is movable further upward ("No" in step S8), the controller unit 50 moves the target G further upward, and then repeats the operations in steps S7 and S8 until pull-out of the target G is determined to be completed (until step S7 results in "Yes") or until the six-axis robot arm 21 reaches a drive limit (until step S8 results in "Yes").

If it is determined that pull-out of the target G is completed ("Yes" in step S7), as shown in FIG. 9, the controller unit 50 stops the upward movement of the target G, and drives the six-axis robot arm 21, as shown in FIG. 10, to move the target G to the conveyor 6 along a calculated movement path R (step S9). This movement path R is indicated by the dashed-two dotted line in FIG. 10.

If the target G is moved to the conveyor 6, the controller unit 50 stops driving the pump 23a of the negative pressure generating apparatus 23 to release the holding (absorption) of the target G by the absorbing unit 22. In this manner, the movement of the target G to the conveyor 6 is completed.

If the movement of the target G to the conveyor 6 is completed, the controller unit 50 determines whether or not the movement of all the cargoes 2 to the conveyor 6 is completed (step S10). If the controller unit 50 determines that the movement of all the cargoes 2 to the conveyor 6 is not completed ("No" in step S10), the processing returns to step S1.

The controller unit 50 analyzes photography information by the camera 30 and determines whether or not there is a height difference in the upper surface 3c of the cargo group 3 (steps S1 and S2). When the previous target G is moved out, the upper surface 3c of the cargo group 3 loses its flat shape and a portion in which the previous target G was arranged becomes lower by one layer than the other portion. Therefore, the controller unit 50 determines that there is a height difference in height position of the upper surfaces of the cargoes 2 arranged on the uppermost layer of the cargo group 3 ("Yes" in step S2).

If it is determined that there is a height difference in the upper surface 3c of the cargo group 3, the controller unit 50 sets the cargo 2 positioned in the highest position to the target G (step S11). In this example, a portion of the upper surface 3c of the cargo group 3 is lower by one layer, and the other portion has a fixed height. If there are a plurality of cargoes 2 positioned in the highest position, the controller unit 50 has a rule, for example, that the target G is set to one of these cargoes 2, which is closer to the conveyor 6 and the six-axis robot arm 21. Under this rule, the controller unit 50 sets to the target G, one of the two cargoes 2 arranged in the surface 3a, the one positioned closer to the six-axis robot arm 21.

When the target G is set, the controller unit 50 determines based on photography information by the camera 30, whether or not the target G forms the outermost periphery facing to the conveyor 6 (destination location) in a plane view of the cargo group 3 (step S11A). In this example, the target G forms the outermost periphery facing to the conveyor 6. Therefore, the controller unit 50 determines that the target G forms the outermost periphery facing to the conveyor 6 ("Yes" in step S11A). When this determination is made, the controller unit 50 causes the arm controller 50c to control the six-axis robot arm 21 in a manner to horizontally move the target G to a position which does not overlap with the cargo group 3 at least in the vertical direction. At this time, the target G is horizontally moved to the conveyor 6 side that is free of obstacles. In addition, the target G may be caused to horizontally move after slightly moving upward so as not to rub any cargo below the target G. When the target G is horizontally moved to a position which does not overlap with the cargo group 3 in the vertical direction, the controller unit 50 calculates a movement path for moving the target to the conveyor 6, and drives the six-axis robot arm 21 in a manner to move the target G along this movement path. If the target G is moved to the conveyor, the controller unit 50 stops the negative pressure generating apparatus 23 to release the absorption of the target G by the absorbing unit 22. Then the processing returns to step S1.

If the target G forms the outermost periphery facing to the conveyor 6 in a plane view of the cargo group 3, the controller unit 50 moves the target G to the conveyor 6 in this manner. That is, the controller unit 50 sets to the targets G, the remaining three cargoes 2 (including the two cargoes 2 arranged in the surface 3b, assigned with reference symbol Z in FIG. 11) facing to the conveyor 6, and thereafter moves them to the conveyor 6 in a similar manner (step S1, "Yes" in step S2, step S11, "Yes" in step S11A, and step S12).

FIG. 12 shows the cargo group 3 in which the four targets G which formed the outermost periphery facing to the conveyor 6 are moved to the conveyor 6. In this state, the controller unit 50 sets one of the cargoes 2, which is closer to the conveyor 6 and the six-axis robot arm 21, to the target G (step S11). In this example, the target G is not a cargo forming the outermost periphery facing to the conveyor 6 in a plane view of the cargo group 3. Therefore, the controller unit 50 determines that the target G does not form the outermost periphery facing to the conveyor 6 ("No" in step S11A). Based on photography information by the camera 30, the controller unit 50 then sets to the determination height position HP1, a position higher by a predetermined distance than the upper surface of the cargo 2 positioned in the second highest position after the target G among the cargoes 2 that face to the conveyor 6 and are positioned closer to the conveyor 6 as compared to the target G (step S12). In this example, the second highest cargo 2 after the target G is the cargo 2 arranged below the three targets G previously moved out.

Upon completion of setting the determination height position HP1, the controller unit 50 advances the processing to and after step S5 to move the sensor 41 to the detection position HP2, and to move the target G upward as shown in FIG. 12 by driving the moving apparatus 20.

In this example, since all the cargoes 2 are the same in shape and dimensions, the cargoes 2 arranged on the uppermost layer are moved to the conveyor 6 by repeating step S1, "Yes" in step S2, step S11, step S12, step S5, step S6, "Yes" in step S7, step S9, "No" in step S10, and step S1. By repeating the similar operations, all the cargoes 2 on the pallet 4 are moved to the conveyor 6. When any of the cargoes 2 exceeds the determination height position HP1, the controller unit 50 calculates the movement path R for moving this cargo 2 to the conveyor 6, and controls the six-axis robot arm 21 in a manner to move the cargo 2 along to this movement path R.

If it is determined based on, for example, photography information by the camera 30, that all the cargoes 2 on the pallet 4 are moved to the conveyor 6 ("Yes" in step S10), the controller unit 50 moves the six-axis robot arm 21 and the sensor 41 to the initial position (steps S13 and S14), thereby terminating the operation. A determination as to whether the movement of all the cargoes 2 to the conveyor 6 is completed or not may be made based on information other than photography information by the camera 30. For example, if the controller unit 50 grasps the number of cargoes 2 included in the cargo group 3 in the initial state, the controller unit 50 can determine whether the movement of all the cargoes 2 to the conveyor 6 is completed or not, by counting the number of cargoes 2 which have been moved.

Next, the operations of the cargo handling apparatus 10 to move the cargoes 2 from a cargo group 3A to the conveyor will be explained with reference to FIGS. 13 to 18. The cargo group 3A includes the plurality of cargoes 2 and a single cargo 2A. The plurality of cargoes 2 are the same in shape and dimensions. The cargo 2A is longer (higher) than the other cargoes 2 in the vertical direction. The cargo 2A is arranged on the uppermost layer of the cargo group 3A. In the cargo group 3A in the initial state, the cargo 2A is arranged in a position in the second row from the surface 3a and in the second row from the surface 3b.

FIGS. 13 to 18 are perspective views showing how the cargoes 2 are moved from the cargo group 3A to the conveyor 6. In the cargo group 3A in the initial state, as shown in FIG. 13, the cargo 2A is positioned in the highest position. Except for the cargo 2A being in the highest position, the cargo group 3A in the initial state forms the same shape as that of the cargo group 3 in the initial state.

The controller unit 50 analyzes photography information by the camera 30, determines that there is a height difference in the upper surface 3c of the cargo group 3A, and sets the cargo 2A to the target G (step S1, "Yes" in step S2, and step S11). As shown in FIG. 13, when the target G is set, the controller unit 50 sets to the determination height position HP1, a position higher by a predetermined distance than the upper end of the cargo 2 positioned in the second highest position after the target G among the cargoes 2 that face to the conveyor 6 and are positioned closer to the conveyor 6 as compared to the target G (step S12). In this example, the second highest cargo 2 after the target G among the cargoes 2 that face to the conveyor 6 and are positioned closer to the conveyor 6 as compared to the target G corresponds to the three cargoes (assigned with reference number 2c in the drawings) arranged on the uppermost layer of the surface 3a.

When the determination height position HP1 is set, the controller unit 50 moves the sensor 41 to the detection position HP2 and fixes the sensor 41 thereto after the movement (step S5).

When the sensor 41 is fixed to the detection position HP2, the controller unit 50 drives the cargo handling apparatus 10 to move the target G upward, as shown in FIG. 14A (step S6). The target G (cargo 2A) has the length in the vertical direction to the extent that the six-axis robot arm 21 does not exceed the determination height position HP1 even in a state where the six-axis robot arm 21 is moved upward to a maximum.

Until the six-axis robot arm 21 is moved upward to a maximum, that is, within a movable range of the six-axis robot arm 21, the controller unit 50 periodically determines whether or not pull-out of the target G is completed (steps S7 and S8).

If it is determined that the six-axis robot arm 21 is moved upward to a maximum while the target G does not exceed the determination height position HP1 ("Yes" in step S8), the controller unit 50 determines that pull-out of the target G is impossible. If pull-out of the target G is determined to be impossible, the controller unit 50 stops the movement of the six-axis robot arm 21 (step 315).

If pull-out of the target G is determined to be impossible, the controller unit 50 determines whether or not this determination with respect to this target G is made for the second time. In practice, the controller unit 50 determines whether a flag is 1 or not (step S16).

If it is determined that a flag is 0, that is, a determination that pull-out of this target G is impossible is made for the first time ("No" in step S16), the controller unit 50 controls the six-axis robot arm 21 to return the target G to its initial position by moving it downward (step S17).

If the target G is returned to its initial position, the controller unit 50 stops driving the pump 23*a* of the negative pressure generating apparatus 23 to release the holding (absorption) of the target G by the absorbing unit 22. The controller unit 50 cancels the setting of the target G. The controller unit 50 sets a flag to 1 (step S18).

If a flag is set to 1, based on photography information by the camera 30, the controller unit 50 sets to the target G, the cargo 2 which forms the outermost periphery facing to the conveyor 6 in a plane view of the cargo group 3A and also forms a portion of the upper surface 3*c* (step S19). Explained below is the cargo 2 which forms the outermost periphery facing to the conveyor 6 in a plane view of the cargo group 3A. FIG. 14B is a plane view showing the cargo group 3A. That is, FIG. 14B shows a shape of the cargo group 3A when viewed in a plane view. As shown in FIG. 14B, a cargo which forms the outermost periphery facing to the conveyor 6 in a plane view is assigned with reference number 2B. That is, the cargo forming the outermost periphery is a cargo forming the outer edge of the shape (planar shape) of the cargo group when viewed in a plane view. In this example, the plurality of cargoes 2 arranged on the uppermost layer of the cargoes 2 arranged on the surface 3*a* or 3*b* are set to the targets G. In the case where the plurality of targets G are set, the controller unit 50 further determines a moving order.

As an example of a moving order, the targets G may be moved in the order from the target closest to the conveyor 6. In this example, as FIG. 14A shows the numbers, order 1 (assigned with number [1] in the drawing) is set to the target G arranged in the surfaces 3*a* and 3*b*, order 2 (assigned with number [2] in the drawing) is set to one of the remaining two targets arranged in the surface 3*a*, and order 3 (assigned with number [3] in the drawing) is set to the other of the remaining two targets. Order 4 (assigned with number [4] in the drawing) is set to one of the two targets G arranged in the surface 3*b*, whereas order 5 (assigned with number [5] in the drawing) is set to the other.

When the target G is set, the controller unit 50 drives the moving apparatus 20 to move the target G to the conveyor 6. If there are the plurality of targets G, the targets are moved to the conveyor 6 in the set order (step S20).

At this time, the controller unit 50 moves the target G in the horizontal direction to a position in which at least the target G does not overlap with the cargo group 3A in the vertical direction. To be more specific, the controller unit 50 moves the target G in the horizontal direction to a side with no other cargoes 2 arranged. As shown in FIG. 15, while the target G is arranged in the surface 3*a*, no other cargoes 2 are arranged in the opposite side of the target G with the surface 3*a* interposed. Therefore, the controller unit 50 horizontally moves the target G arranged in the surface 3*a* to the conveyor 6 side.

As shown in FIG. 16, while the target G is arranged in the surface 3*b*, no other cargoes 2 are arranged in the six-axis robot arm 21 side. Therefore, the controller unit 50 horizontally moves the target G arranged in the surface 3*a* to the six-axis robot arm 21 side. The target G arranged in both the surface 3*a* and the surface 3*b* may be horizontally moved in either the conveyor 6 side or the six-axis robot arm 21 side.

At the time of horizontal movement, the target G may be caused to horizontally move after moving upward by a predetermined distance so that a gap is secured between the target G and any of the other cargoes arranged below the target G or the pallet 4 so as to prevent the target G from rubbing any of the cargoes positioned below or the pallet 4. This predetermined distance may be small to the extent that rubbing by the target G can be prevented.

When the target G is horizontally moved to a position in which the target G does not overlap with the cargo group 3 in the vertical direction, the controller unit 50 drives the six-axis robot arm 21 in a manner to move the target G along a calculated movement path R to the conveyor 6.

If the target G is moved to the conveyor 6, the controller unit 50 stops driving the pump 23*a* of the negative pressure generating apparatus 23 to release the holding of the target G by the absorbing unit 22. In this manner, the movement of the target G to the conveyor 6 is completed.

If the movement of the single target G to the conveyor 6 is completed, the controller unit 50 determines whether or not the movement of all the cargoes 2 to the conveyor 6 is completed (step S21). The controller unit 50 can determine based on, for example, photography information by the camera 30, whether or not the movement of all the targets G to the conveyor 6 is completed.

The controller unit 50 repeats the operation in step S20 until it is determined that the movement of all the targets G to the conveyor 6 is completed. As shown in FIG. 17, if the controller unit 50 determines that the movement of all the targets G to the conveyor 6 is completed ("Yes" in step S21), the processing returns to step S1.

The controller unit 50 determines based on the highest cargo 2A that the upper surface 3*c* of the cargo group 3A has a height difference (Step S1 and "Yes" in step S2). The controller unit 50 sets the highest cargo 2A to the target G (step S11). The controller unit 50 sets the determination height position HP1 based on a height position of the upper surface of the second highest cargo 2 after the target G among the cargoes 2 that face to the conveyor 6 and are positioned closer to the conveyor 6 as compared to the target G (step S12). In this example, the second highest cargo 2 after the target G among the cargoes 2 that face to the conveyor 6 and are positioned closer to the conveyor 6 as compared to the target G corresponds to the three cargoes (assigned with reference number 2*c* in the drawings) arranged on the uppermost layer of the surface 3*a*, as shown in FIG. 17. The controller unit 50 moves the sensor 41 to the detection position HP2 (step S5).

The controller unit 50 drives the moving apparatus 20 to move the target G upward (step S6). In this example, the target G (cargo 2A) has the length in the vertical direction to the extent that when the cargo 2 arranged on the uppermost layer of the cargo group 3 in the initial state is moved, this cargo 2 can exceed the determination height position HP1.

Figure 18:
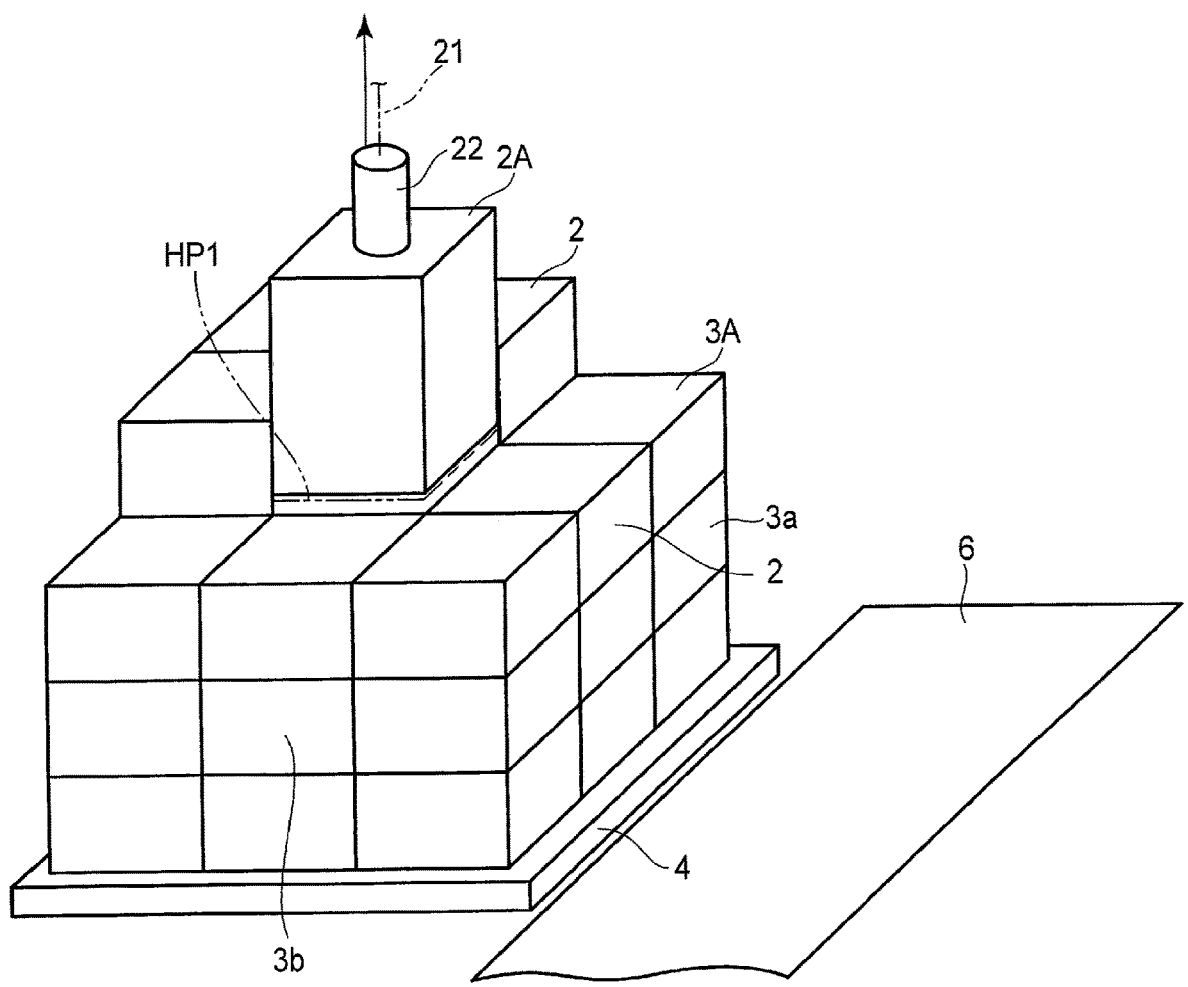
FIG. 18 is a perspective view showing how a cargo is moved from the cargo group.

If it is determined that pull-out of the target G is completed ("Yes" in step S7) as shown in FIG. 18, the controller unit 50 moves the target G to the conveyor 6 (step S9).

In this example, the other cargoes of the cargo group 3A have the length in the vertical direction to the extent that they can exceed the determination height position HP1 which is set each time. This enables the controller unit 50 to move all the cargoes on the pallet 4 to the conveyor 6 by repeating the operations in and after step S1 without making the determination of the impossibility of pull-out with respect to the same target G twice. When any of the cargoes 2 exceeds the determination height position HP1, the controller unit 50 calculates the movement path R for moving this cargo 2 to the conveyor 6, and controls the six-axis robot arm 21 in a manner to move the cargo 2 along to this movement path R.

Next, operations of the cargo handling apparatus 10 to move the cargoes from a cargo group 3B to the conveyor will be explained with reference to FIGS. 19 to 21. The cargo group 3B is different from the cargo group 3A in position of the cargo 2A. In the cargo group 3B, the cargo 2A is arranged in a position in the third row from the surface 3a and in the third row from the surface 3b.

Figure 19:
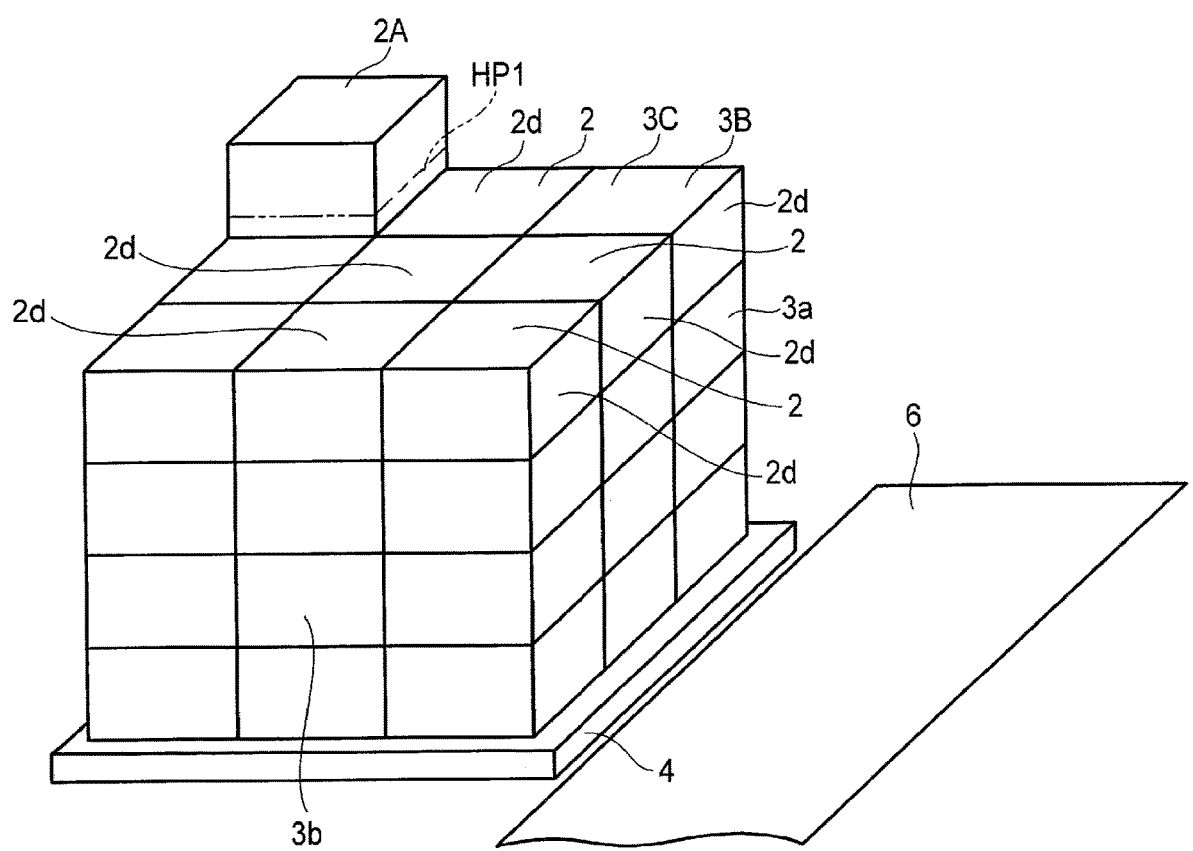
FIG. 19 is a perspective view showing how a cargo is moved from the cargo group.

FIGS. 19 to 21 are perspective views showing how the cargoes are moved from the cargo group 3B. In the cargo group 3B in the initial state, as shown in FIG. 19, the cargo 2A is positioned in the highest position. Except for the cargo 2A being in the highest position, the cargo group 3B in the initial state forms the same shape as that of the cargo group 3.

The controller unit 50 determines from photography information by the camera 30 that there is a height difference in the upper surface 3c of the cargo group 3B (step S1 and "Yes" in step S2). In this example, the cargo 2A is positioned in the highest position, and the other cargoes 2 arranged on the uppermost layer have their upper surfaces with the same height. The controller unit 50 sets the highest cargo 2A to the target G (step S11). The controller unit 50 sets the determination height position HP1 based on a height position of the upper surface of the second highest cargo 2 after the target G among the cargoes 2 that face to the conveyor 6 and are positioned closer to the conveyor 6 as compared to the target G (step S12). In this example, the second highest cargo 2 after the target G among the cargoes 2 that face to the conveyor 6 and are positioned closer to the conveyor 6 as compared to the target G corresponds to the six cargoes (assigned with reference number 2d in the drawings) arranged on the uppermost layer in the first and second rows from the surface 3a.

In this example, the target G has the length in the vertical direction to the extent that the target G cannot exceed the determination height position HP1. Accordingly, the controller unit 50 determines that pull-out of the target G is impossible from the fact that the target G does not exceed the determination height position HP1 at the time when the six-axis robot arm 21 is moved upward to a maximum, as shown in FIG. 20 (step S15).

If it is determined that pull-out of the target G is impossible, the controller unit 50 returns the target G to its initial position and sets a flag to 1 ("No" in step S16, step S17, and step S18). If a flag is set to 1, based on photography information by the camera 30, the controller unit 50 sets to the target G, the cargo 2 which forms the outermost periphery facing to the conveyor 6 in a plane view of the cargo group 3B and also forms a portion of the upper surface 3c, that is, in this example, the cargo 2 arranged on the uppermost layer among the cargoes 2 arranged on the surface 3a or 3b, and then the controller unit 50 moves all the targets G to the conveyor 6 as shown in FIG. 21 (steps S19, S20, and S21). After slightly moving upward the target G, the target G is further moved in the horizontal direction in which no obstacles exist, to a position in which the target G does not overlap with at least the cargo group 3B in the vertical direction. The target G is then moved to the conveyor 6 along the calculated movement path R.

If the controller unit 50 determines that the movement of all the targets G to the conveyor 6 is completed ("Yes" in step S21), the processing returns to step S1, and sets the highest cargo 2A to the target G again and sets the determination height position HP1 ("Yes" in step S2, step S11, and step S12).

The cargoes 2 arranged around the target G (cargo 2A) are the same as those in the cargo group 3B in the initial state. That is, this determination height position HP1 is the same as that in the previous time. Therefore, the target G cannot exceed the determination height position HP1.

Accordingly, the controller unit 50 determines the impossibility of pull-out with respect to the same target G again (step S5, step S6, "No" in step S7, "Yes" in step S8, and step S15). If pull-out of the target G is determined to be impossible, the controller unit 50 determines whether a flag is 1 or not (step S16).

The controller unit 50 determines that a flag is 1 this time ("Yes" in step S16). If a flag is determined to be 1, the controller unit 50 returns the six-axis robot arm 21 to its initial position (step S22). If the six-axis robot arm 21 is returned to its initial position, the controller unit 50 stops the movement of the six-axis robot arm 21 and notifies a worker, etc., through the notification apparatus 60 (step S23).

If notification is performed using the notification apparatus 60, the controller unit 50 sets a flag to 0 (step S24) and terminates the operation.

The cargo handling apparatus 10 thus configured sets the determination height position HP1 of the highest cargoes 2 and 2A based on a height position of the upper end (upper surface) of the second highest cargo after the target G among the plurality of the cargoes 2 and 2A of the cargo groups 3, 3A, and 3B, the cargoes 2 and 2A facing to the conveyor 6 and being positioned closer to the conveyor 6 as compared to the target G. Alternatively, the determination height position HP1 is set based on a height position of the upper surface 3c in the case where the upper surface 3c of the cargo group 3 in the initial state has no height difference, that is, the upper surfaces of the plurality of cargoes 2 arranged on the uppermost layer are positioned in the same height position.

When the moving apparatus 20 moves the cargo 2 set to the target G from the cargo groups 3, 3A, and 3B to the conveyor 6, the controller unit 50 can determine that pull-out of the target G is impossible within a movable range of the moving apparatus 20 if the sensor 41 detects that the target G does not exceed the determination height position HP1 within a movable range of the six-axis robot arm 21. If it is determined that the cargoes 2 and 2A are impossible to pull out from the cargo groups 3, 3A, and 3B, the controller unit 50 stops the movement of the moving apparatus 20.

With the camera 30 and the sensor 41, as described above, the cargo handling apparatus 10 stops the movement operation of the target G if the target G cannot be pulled out. If the target G that is impossible to pull out is moved to the conveyor 6, it can be assumed that the target G comes in contact with another cargo 2. In such a case, it can also be assumed that this cargo 2 with which the target G comes in contact falls from the cargo groups 3, 3A, and 3B.

However, in the present embodiment, the movement to the conveyor 6 is stopped with respect to the target G determined to be impossible to pull out. This prevents contact between the cargoes 2 or fall of the cargoes 2. Therefore, the cargoes 2 can be safely moved to the conveyor 6 as a destination location.

If it is determined that pull-out of the cargo 2 set to the target G is impossible, the controller unit 50 moves the cargoes each of which forms the outermost periphery facing to the conveyor 6 in a plane view of the cargo groups 3, 3A, and 3B and also forms at least a portion of the upper surface 3c, to a position in which the cargoes do not overlap with at least the cargo groups 3, 3A, and 3B in the horizontal direction. There are no other cargoes 2 which prevent the cargoes 2 described above from moving in the horizontal direction. This allows the horizontal movement of the cargoes 2 so that they can be moved to the conveyor 6.

As described, even if the movement of the cargo 2 set to the target G is impossible, the cargo handling apparatus 10 can move the other cargoes 2 to the conveyor 6. This enables the movement of more cargoes 2 to the conveyor 6. Furthermore, using a laser range finder as the sensor 41 increases a degree of freedom in terms of an installation place of the sensor 41. Specifically, the laser range finder is to detect a distance to a detection object and does not particularly require a predetermined distance to perform detection. Thus, the cargo handling apparatus 10 can be made compact. For example, in the case of using a camera or the like as a detecting unit configured to detect information on the vertical movement of the target G, the cargo handling apparatus 10 may be increased in size because such a camera requires a predetermined distance between the camera and the cargo group 3 in order to photograph the entire cargo group 3.

In the present embodiment, the cargo 2 arranged on the edge of the upper surface of each of the cargo groups 3A and 3B in a rectangular parallelepiped shape is selected as the cargo 2 which forms the outermost periphery facing to the conveyor 6 in a plane view of the cargo groups 3A and 3B and also forms at least a portion of the upper surface 3c, as shown in FIGS. 15 and 20. For example, if the upper surface 3c has a complicated height difference as in the cargo group 3B shown in FIG. 21, each of cargoes assigned with reference number 2e forms the outermost periphery facing to the conveyor 6 in a plane view of the cargo group 3B and also forms the upper surface 3c. The cargoes 2e may be set to the target G to be moved in the horizontal direction.

In the present embodiment, the camera 30 is used as the first detecting unit that detects the plurality of cargoes forming the upper surface of the cargo group and also detects a height position of each of the cargoes forming the upper surface, while the sensor 41 as a laser range finder is used as the second detecting unit that detects information on the vertical movement of a target. However, the first detecting unit and the second detecting unit are not limited to the camera 30 and the sensor 41. For example, in another example, the camera 30 may function as not only the first detecting unit but also the second detecting unit. In such a case, the camera 30 may be installed in a position obliquely upward with respect to the arrangement position 5 in a manner so that the camera 30 can photograph not only the upper surface of the cargo group 3 on the pallet 4 arranged in the arrangement position 5 but also the surfaces 3a and 3b facing to the conveyor 6.

In this embodiment, the conveyor 6 is used as an example of a destination location to which the cargo handling apparatus 10 moves a cargo (target). However, in another example, a destination location may be a shelf.

In this embodiment, the upper surface 3c of the cargo groups 3, 3A, and 3B is formed by the plurality of cargoes 2 and 2A. In a cargo group in another example, the upper surface 3c may be formed by laminating the plurality of cargoes in a single line in the vertical direction. In such a case, a single cargo arranged on the uppermost layer forms the upper surface of the cargo group. In this case, the controller unit 50 determines that the upper surface of the cargo group has no height difference.

In the present embodiment, the target G is moved in the horizontal direction if this target G is the cargo forming the outermost periphery that faces to the conveyor 6 in a plane view of the cargo group 3 ("Yes" in step S11A, and step S11B). It is because there is no cargo 2 used as a reference for setting a determination height position HP1 to determine whether the target G is pulled out or not. In another example, however, in step S11A, the controller unit 50 may determine whether or not there is a cargo closer to the conveyor 6 as compared to the target G in a plane view of the cargo group 3. In such a case, if the cargo group 3 is in a state shown in FIG. 11, based on the determination result in step S11A, only two cargoes 2 arranged on the uppermost layer of the surface 3a are horizontally moved to the conveyor 6. With the cargo group 3 being in the state shown in FIG. 11, in addition to the two cargoes arranged on the uppermost layer of the surface 3b, there is another cargo 2 closer to the conveyor 6 under the presence of the cargo 2 arranged in the surface 3a.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A cargo handling apparatus that transfers each cargo of a plurality of cargoes included in a cargo group to a destination location, the cargo handling apparatus comprising:

a first detecting unit that detects height positions of the cargoes forming an upper surface of the cargo group with respect to a reference position:

a target setting unit that sets a cargo positioned in a highest position of the cargo group to a target based on a detection result by the first detecting unit, or if it is determined based on a detection result by the first detecting unit that the upper surface has no height difference, sets any one of the cargoes, forming a portion of the upper surface to the target;

a determination height position setting unit that sets, based on a detection result by the first detecting unit, a determination height position to a position higher by a predetermined distance than an upper end of a cargo positioned in a second highest position after the target with respect to the reference position, among the cargoes that face to the destination location and are positioned closer to the destination location as compared to the target, or if it is determined based on a detection result by the first detecting unit that the upper surface has no height difference, sets the determination height position to a position higher by the predetermined distance than the upper surface;

a moving apparatus operable to hold the target and move the held target in a vertical direction and to move the held target in a horizontal direction;

a second detecting unit that detects information on a vertical movement of the target; and a controller unit that moves the target upward by driving the moving apparatus, and if it is determined based on a detection result by the second detecting unit that the target does not exceed the determination height position within a movable range of the moving apparatus, determines that pull-out of the target is impossible, and stops an operation of the moving apparatus so as to stop a movement of the target.

2. The cargo handling apparatus according to claim 1, wherein:

the controller unit returns the target to an original position by driving the moving apparatus if it is determined that pull-out of the target is impossible;

the target setting unit sets, if the controller unit determines that pull-out of the target is impossible, to a target, a cargo that forms an outermost periphery facing to the destination location in a plane view of the cargo group and also forms a portion of the upper surface of the cargo group; and the controller unit moves the cargo that is set to the target, forms the outermost periphery facing to the destination location, and forms a portion of the upper surface of the cargo group, in a horizontal direction away from the cargo group.

3. The cargo handling apparatus according to claim 1, wherein:

the first detecting unit is a camera that photographs the upper surface; and the target setting unit sets the target based on photography information by the camera.

4. The cargo handling apparatus according to claim 1, wherein information on a vertical movement of the target is information on a distance from the second detecting unit to an object opposed to the second detecting unit in a direction in which the target is positioned.

5. A method of operating a cargo handling apparatus including a first detecting unit that detects height positions of cargoes forming an upper surface of a cargo group including a plurality of cargoes with respect to a reference position, a moving apparatus operable to hold a cargo set to a target among the cargoes and move the held target in a vertical direction, and to move the held target in a horizontal direction, and a second detecting unit that detects information on a vertical movement of the target, the cargo handling apparatus moving the target to a destination location, the method comprising:

setting a cargo positioned in a highest position of the cargo group with respect to the reference position to the target based on a detection result by the first detecting unit, or if it is determined based on a detection result by the first detecting unit that the upper surface has no height difference, setting any one of the cargoes, forming a portion of the upper surface to the target;

setting, based on a detection result by the first detecting unit, a determination height position to a position higher by a predetermined distance than an upper end of a cargo positioned in a second highest position after the target among the cargoes that face to the destination location and are positioned closer to the destination location as compared to the target, or if it is determined based on a detection result by the first detecting unit that the upper surface has no height difference, setting the determination height position to a position higher by the predetermined distance than the upper surface; and moving the target upward by driving the moving apparatus, and if it is determined based on a detection result by the second detecting unit that the target does not exceed the determination height position within a movable range of the moving apparatus, determining that pull-out of the target is impossible, and stopping an operation of the moving apparatus so as to stop a movement of the target.

6. The method of operating a cargo handling apparatus according to claim 5, the method comprising:

returning the target to an original position by driving the moving apparatus if it is determined that pull-out of the target is impossible;

setting, if it is determined that pull-out of the target is impossible, to a target, a cargo that forms an outermost periphery facing to the destination location in a plane view of the cargo group and also forms a portion of the upper surface of the cargo group; and moving the cargo that is set to the target, forms the outermost periphery facing to the destination location, and forms a portion of the upper surface of the cargo group, in a horizontal direction away from the cargo group.

* * * * *